(12) United States Patent
Tanaka et al.

(10) Patent No.: US 7,065,023 B2
(45) Date of Patent: Jun. 20, 2006

(54) LIGHT SPOT ADVANCING DIRECTION JUDGING DEVICE AND METHOD, OPTICAL HEAD DEVICE CONTROL DEVICE AND METHOD, AND OPTICAL DISK RECORDING/REPRODUCING DEVICE

(75) Inventors: Tomiji Tanaka, Miyagi (JP); Shinichi Nakao, Kanagawa (JP); Sohmei Endoh, Miyagi (JP); Tamotsu Ishii, Chiba (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 10/240,001

(22) PCT Filed: Feb. 8, 2002

(86) PCT No.: PCT/JP02/01107

§ 371 (c)(1),
(2), (4) Date: Dec. 9, 2002

(87) PCT Pub. No.: WO02/063616

PCT Pub. Date: Aug. 15, 2002

(65) Prior Publication Data

US 2004/0008597 A1    Jan. 15, 2004

(30) Foreign Application Priority Data

Feb. 9, 2001 (JP) ............................. 2001-034593

(51) Int. Cl.
G11B 7/00 (2006.01)
(52) U.S. Cl. ................................ 369/53.25; 369/44.28
(58) Field of Classification Search ............ 369/53.25, 369/44.28; G11B 7/00
See application file for complete search history.

(56) References Cited

U.S. PATENT DOCUMENTS

| 5,066,138 | A | * | 11/1991 | Toide et al. ............. 369/112.1 |
| 5,067,120 | A | * | 11/1991 | Yamauchi ................... 369/89 |
| 5,155,717 | A | * | 10/1992 | Bakx ....................... 369/44.37 |
| 5,341,353 | A | * | 8/1994 | Yoshio et al. ............ 369/44.28 |
| 5,392,043 | A | * | 2/1995 | Ribner ....................... 341/143 |
| 5,732,051 | A | * | 3/1998 | Yamaguchi et al. ..... 369/44.25 |
| 5,859,819 | A | * | 1/1999 | Miyabe et al. .......... 369/44.41 |
| 6,320,831 | B1 | * | 11/2001 | Inoue et al. ............. 369/47.22 |
| 6,385,158 | B1 | * | 5/2002 | Takagi et al. .......... 369/112.16 |
| 6,687,201 | B1 | * | 2/2004 | Ma et al. ................. 369/44.28 |

FOREIGN PATENT DOCUMENTS

| JP | 60-103528 | * | 6/1985 |
| JP | 63-160021 | * | 7/1988 |
| JP | 10-083588 A | * | 3/1998 |
| JP | 2000-090496 A | * | 3/2000 |
| JP | 2000-251274 A | * | 9/2000 |

* cited by examiner

*Primary Examiner*—A M Psitos
(74) *Attorney, Agent, or Firm*—Jay H. Maioli

(57) ABSTRACT

A device and a method for judging the radial moving direction of light spots formed on the signal recording surface of an optical disc having grooves of two types, which are different from each other in terms of depth and which are arranged along a recording track that is a land of the optical disc. The judging section of the device judges the moving direction of the main spot on the basis of binarized data of a difference signal of the main spot and binarized data of a difference signal of one of spots on the side. With this arrangement, the moving direction of the light spots relative to a radial direction of the optical disc can be determined only by using difference signals without using any sum signal.

30 Claims, 23 Drawing Sheets

FIG.10A X
FIG.10B Y
FIG.10C Z
FIG.10D Q
FIG.10E Q̄
FIG.10F OUTPUT

LIGHT SPOT ADVANCING DIRECTION JUDGING DEVICE AND METHOD, OPTICAL HEAD DEVICE CONTROL DEVICE AND METHOD, AND OPTICAL DISK RECORDING/REPRODUCING DEVICE

This application is a 371 of PCT/JP02/01107 Feb. 8, 2002.

TECHNICAL FIELD

The present invention relates to a device and a method of judging the radial moving direction of light spots formed on the signal recording surface of an optical disc having grooves of two types that are different from each other in terms of depth and arranged along a recording track that is a land of the optical disc. The present invention also relates to a device and a method of controlling an optical head for forming light spots on the signal recording surface of an optical disc having helical lands and helical grooves of two types that are different from each other in terms of depth and arranged oppositely to sandwich the lands. Furthermore, the present invention relates to an optical disc recording/replay apparatus adapted to form light spots on the signal recording surface of an optical disc having helical lands and helical grooves of two types that are different from each other in terms of depth and arranged oppositely to sandwich the lands.

BACKGROUND ART

When moving the light spots formed on an optical disc by light beams so as to be focused there, the sliding motor and the drive section of the objective lens are fed with an electric current. At this time, the direction in which the sliding motor and the objective lens are intended to be driven to move and the actual moving direction of the light spot do not necessarily agree with each other because of the backlash of the sliding motor and the objective lens relative to their proper motions. Therefore, it is necessary to provide a device for constantly detecting the direction in which the light spots cross the tracks and keep it operating whenever the sliding motor and the objective lens are driven to move.

FIG. 1 of the accompanying drawings schematically illustrates the principle of a known method of judging the moving direction of the light spot formed on a conventional optical disc having grooves that are formed along the lands of the optical disc without differentiating the depths of the grooves. The known method will be discussed in detail below by referring to FIG. 1.

Of the graphs in FIG. 1, a shows the profile of the grooves of the known optical disc and b shows the waveform of the difference signal obtained from a pair of reflected light detection signals of a light spot that is formed on the optical disc, while c shows the waveform of the sum signal of the detection signals. In FIG. 1, the horizontal axis represents the radial distance on the disc for all the graphs while the vertical axis represents the depth of the grooves for the graph a and the signal amplitude for the graphs b and c.

The difference signal as used herein refers to the difference between the first light detection output A obtained from the light spot formed on the optical disc by a light beam so as to cover a pair of grooves having a same depth and sandwiching a land as the light beam of the light spot is reflected and deflected by one of the pair of grooves and the second light detection output B obtained from the same light spot as the light beam is reflected and deflected by the other groove, or A–B, which is a push-pull signal. On the other hand, the sum signal as used herein refers to the sum of the detection output A of the first light beam and the detection output B of the second light beam, or A+B.

In FIG. 1, the graphs d and e respectively show signal DP (digitalized push-pull) generated by binarizing the difference signal and signal DS (digitalized sum) generated by binarizing the sum signal. The moving direction of the light spot of the irradiated light beam can be determined by using the signals DP and DS in a manner as will be described hereinafter.

Referring now to FIG. 2 showing a D flip-flop circuit 100, the signal DP is applied to the data input terminal D of the D flip-flop circuit 100 and the signal DS is applied to the control input terminal of the D flip-flop circuit 100. If the light spot moves from left L to right R as indicated by arrow (L→R) across the grooves having a depth as shown in the graph a, the DS rises at the parts indicated by 0 and the output Q is "L" for those parts because the corresponding level of the DP is "L". If, to the contrary, the light spot moves from right R to left L as indicated by arrow (L→R) across the grooves, the DS rises at the parts indicated by A and the output Q is "H" for those parts because the corresponding level of the DP is "H".

Thus, if the output signal Q is "L", the light spot is judged to be radially crossing the tracks from left L to right R. If, on the other hand, the output signal Q is "H", the light spot is judged to be radially crossing the tracks from right R to left L. In other words, it is possible to accurately determine the moving direction of the light spot by seeing the output signal Q. This technique utilizes the fact that the phase of the DS and that of the DP and hence the phase of the sum signal and that of the difference signal, from which the signals DS and DP are generated, are differentiated by 90 degrees.

Meanwhile, a high signal recording density can be effectively achieved for optical discs by raising the track density as well as the line density. The track density can be raised either by a land and groove method of recording signals on both the lands and the grooves of the optical disc or by a shallow and deep method of using a pair of grooves including a shallow groove and a deep groove that are arranged oppositely and helically to sandwich a land at a time as disclosed in Japanese Patent Application Laid-Open Publication No. 11-296910, which was filed by the applicant of this patent application.

The method disclosed in Japanese Patent Application Laid-Open Publication No. 11-296910 of the shallow and deep method using a pair of grooves whose depths are differentiated from each other will be described below in greater detail particularly in terms of recording signals on the land. The grooves of tracks that are adjacently located on a conventional optical disc have a same depth and a same width. If the tracks are arranged at an increased pitch on such an optical disc, the spatial frequency of the tracks will exceed the MTF (modulation transfer function) of the optical disc and tracking signals will no longer be generated there. Thus, the track density of conventional optical disc is limited by the tracking inability although a higher track density may be required to improve the recording/replaying performance of the optical disc.

With the shallow and deep method, every pair of adjacently arranged grooves are made to have differentiated depths. As a result, a frequency component of ½ of the track pitch is generated to make it possible to obtain a tracking error signal. With the shallow and deep method to be used with an optical disc having two tracks, the tracks are made to have profiles that are mirror-symmetric relative to each other and therefore it is easy to make them show same recording characteristics. From this point of view, there is a clear contrast between the shallow and deep method and the land and groove method, with which different tracks show different recording characteristics because signals are recorded on different areas including lands and grooves.

By the way, with the shallow and deep method, the tracking error signal shows a unit cycle of two tracks and hence both the difference signal and the sum signal are different from those of conventional optical discs. Additionally, there may be cases where the sum signal is not obtainable depending on the depths of the two grooves, although the difference signal is always obtainable. Therefore, with an optical disc designed to be used with the shallow and deep method, it is difficult to determine the moving direction of the main light spot only from the detection signal of the reflected light coming from a single light spot on the optical disc.

DISCLOSURE OF THE INVENTION

It is an object of the present invention to provide a device and a method of judging the radial moving direction of light spots on a disc by using only difference signal without using any sum signal.

It is another object of the present invention to provide a device and a method of controlling an optical head by judging the radial moving direction of light spots on a disc, using only difference signals without using any sum signal, and accurately radially moving the optical head according to the user's intention on the basis of the judgment.

It is a further object of the present invention to provide an optical disc recording/replay apparatus that is adapted to record signals onto and reproduce signals from an optical disc by judging the radial moving direction of light spots on a disc, using only difference signals without using any sum signal, and accurately radially moving the optical head according to the user's intention on the basis of the judgment.

In an aspect of the invention, there is provided a light spot moving direction judging device for detecting the reflected light coming from a main spot formed on an optical disc by a light beam irradiated onto the optical disc and the reflected light coming from a side spot formed on the optical disc by a light beam also irradiated onto the optical disc and judging the radial moving direction of the main spot on the basis of the outcome of the detection, said optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the device comprising: a first computing means for computationally producing the difference signal of the two signals obtained by detecting the quantity of light of the reflected light coming from the main spot by means of two divided detecting regions; a second computing means for computationally producing the difference signal of the two signals obtained by detecting the quantity of light of the reflected light coming from the one side spot by means of two divided detecting regions; a first binarizing means for binarizing the difference signal of the main spot computationally produced by the first computing means; a second binarizing means for binarizing the difference signal of the side spot computationally produced by the second computing means; and a judging means for judging the moving direction of the main spot on the basis of the binarized data from the first binarizing means and the binarized data from the second binarizing means.

In the light spot moving direction judging device according to the invention, the judging means judges the moving direction of the main spot on the basis of the binarized data of the difference signal of the main spot from the first binarizing means and the binarized data of the difference signal of the side spot from the second binarizing means.

In another aspect of the invention, there is provided a light spot moving direction judging method for detecting the reflected light coming from a main spot formed on an optical disc by a light beam irradiated onto the optical disc and the reflected light coming from a side spot formed on the optical disc by a light beam also irradiated onto the optical disc and judging the radial moving direction of the main spot on the basis of the outcome of the detection, said optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the method comprising: a first computing step of computationally producing the difference signal of the two signals obtained by detecting the quantity of light of the reflected light coming from the main spot by means of two divided detecting regions; a second computing step of computationally producing the difference signal of the two signals obtained by detecting the quantity of light of the reflected light coming from the one side spot by means of two divided detecting regions; a first binarizing step of binarizing the difference signal of the main spot computationally produced from the first computing step; a second binarizing step of binarizing the difference signal of the side spot computationally produced from the second computing step; and a judging step of judging the moving direction of the main spot on the basis of the binarized data from the first binarizing step and the binarized data from the second binarizing step.

With the light spot moving direction judging method according to the invention, the moving direction of the main spot is judged in the judging step on the basis of the binarized data of the difference signal of the main spot from the first binarizing step and the binarized data of the difference signal of the side spot from the second binarizing step.

In still another aspect of the invention, there is provided a light spot moving direction judging device for detecting the reflected light coming from a main spot formed on an optical disc by a light beam irradiated onto the optical disc and the reflected light coming from a pair of side spots formed on the optical disc by a pair of light beams also irradiated onto the optical disc and judging the radial moving direction of the main spot on the basis of the outcome of the detection, said optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the device comprising: a first computing means for computationally producing the difference signal of the two signals obtained by detecting the quantity of light of the reflected light coming from the main spot by means of two divided detecting regions; a second computing means for computationally producing the difference signal of the two signals obtained by detecting the quantity of light of the reflected light coming from one of the side spots by means of two divided detecting regions; a third computing means for computationally producing the difference signal of the two signals obtained by detecting the quantity of light of the reflected light coming from the other side spots by means of two divided detecting regions; a fourth computing means for computationally producing the difference signal of the difference signal computationally produced by the second computing means and the difference signal computationally produced by the third computing means; a first binarizing means for binarizing the difference signal of the main spot computationally produced by the first computing means; a second binarizing means for binarizing the difference signal of the difference signals of the two side spots computationally produced by the fourth computing means; and a judging means for judging the moving direction of the main spot on the basis of the binarized data from the first binarizing means and the binarized data from the second binarizing means.

In the light spot moving direction judging device, the judging means judges the moving direction of the main spot on the basis of the binarized data of the difference signal of the main spot from the first binarizing means and the binarized data of the difference signal of the difference signals of the two side spots from the second binarizing means.

In still another aspect of the invention, there is provided a light spot moving direction judging method for detecting the reflected light coming from a main spot formed on an optical disc by a light beam irradiated onto the optical disc and the reflected light coming from a pair of side spots formed on the optical disc by a pair of light beams also irradiated onto the optical disc and judging the radial moving direction of the main spot on the basis of the outcome of the detection, said optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the method comprising: a first computing step of computationally producing the difference signal of the two signals obtained by detecting the quantity of light of the reflected light coming from the main spot by means of two divided detecting regions; a second computing step of computationally producing the difference signal of the two signals obtained by detecting the quantity of light of the reflected light coming from one of the side spots by means of two divided detecting regions; a third computing step of computationally producing the difference signal of the two signals obtained by detecting the quantity of light of the reflected light coming from the other side spots by means of two divided detecting regions; a fourth computing step of computationally producing the difference signal of the difference signal computationally produced from the second computing step and the difference signal computationally produced from the third computing step; a first binarizing step of binarizing the difference signal of the main spot computationally produced from the first computing step; a second binarizing step of binarizing the difference signal of the difference signals of the two side spots computationally produced from the fourth computing step; and a judging step of judging the moving direction of the main spot on the basis of the binarized data from the first binarizing step and the binarized data from the second binarizing step.

With the light spot moving direction judging method, the moving direction of the main spot is judged in the judging step on the basis of the binarized data of the difference signal of the main spot from the first binarizing step and the binarized data of the difference signal of the difference signals of the two side spots from the second binarizing step.

In still another aspect of the invention, there is provided an optical head control device for controlling an optical head adapted to irradiate a main light beam and a pair of side light beams onto an optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the device comprising: a light spot moving direction judging device having: a first computing means for computationally producing the difference signal of the two signals obtained by detecting the quantity of light of the reflected light coming from the main spot by means of two divided detecting regions; a second computing means for computationally producing the difference signal of the two signals obtained by detecting the quantity of light of the reflected light coming from the one side spot by means of two divided detecting regions; a first binarizing means for binarizing the difference signal of the main spot computationally produced by the first computing means; a second binarizing means for binarizing the difference signal of the side spot computationally produced by the second computing means; and a judging means for judging the moving direction of the main spot on the basis of the binarized data from the first binarizing means and the binarized data from the second binarizing means; and a control means for controlling the position of the optical head in a radial direction of the optical disc on the basis of the moving direction of the main spot as judged by the light spot moving direction judging device, said optical head irradiating light beams onto the optical disc.

In the optical head control device, the judging means judges the moving direction of the main spot on the basis of the binarized data of the difference signal of the main spot from the first binarizing means and the binarized data of the difference signal of the side spot from the second binarizing means.

In still another aspect of the invention, there is provided an optical head control method for controlling an optical head adapted to form a main spot and a pair of side spots onto an optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the method comprising: a light spot moving direction judging step including: a first computing step of computationally producing the difference signal of the two signals obtained by detecting the quantity of light of the reflected light coming from the main spot by means of two divided detecting regions; a second computing step of computationally producing the difference signal of the two signals obtained by detecting the quantity of light of the reflected light coming from the one side spot by means of two divided detecting regions; a first binarizing step of binarizing the difference signal of the main spot computationally produced from the first computing step; a second binarizing step of binarizing the difference signal of the side spot computationally produced from the second computing step; and a judging step of judging the moving direction of the main spot on the basis of the binarized data from the first binarizing step and the binarized data from the second binarizing step; and a control step of controlling the position of the optical head in a radial direction of the optical disc on the basis of the moving direction of the main spot as judged in the light spot moving direction judging step, said optical head irradiating the main spot onto the optical disc.

With the optical head control method, the moving direction of the main spot is judged in the judging step of the light spot moving direction judging step on the basis of the binarized data of the difference signal of the main spot from the first binarizing means and the binarized data of the difference signal of the side spot from the second binarizing means.

In still another aspect of the invention, there is provided an optical head control device for controlling an optical head adapted to form a main spot and a pair of side spots onto an optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the device comprising: a light spot moving direction judging device having: a first computing means for computationally producing the difference signal of the two signals obtained by detecting the quantity of light of the reflected light coming from the main spot by means of two divided detecting regions; a second computing means for computationally producing the difference signal of the two signals obtained by detecting the quantity of light of the reflected light coming from one of the side spots by means of two divided detecting regions; a third computing means for computationally producing the difference signal of the two signals obtained by detecting the quantity of light of the reflected light coming from the other side spots by means of two divided detecting regions; a fourth computing means for computationally producing the difference signal of the difference signal computationally produced by the second computing means and the difference signal computationally produced by the third computing means; a first binarizing means for binarizing the difference signal of the main spot computationally produced by the first computing means; a second binarizing means for binarizing the difference signal of the difference signals of the two side spots computationally produced by the fourth computing means; a judging means for judging the moving direction of the main spot on the basis of the binarized data from the first binarizing means and the binarized data from the second binarizing means; and a control means for controlling the position of the optical head in a radial direction of the optical disc on the basis of the moving direction of the main spot as judged by the light spot moving direction judging device, said optical head irradiating the main spot onto the optical disc.

In the optical head control device, the judging means of the light spot moving direction judging device judges the moving direction of the main spot on the basis of the binarized data of the difference signal of the main spot from the first binarizing means and the binarized data of the difference signal of the difference signals of the two side spots from the second binarizing means.

In still another aspect of the invention, there is provided an optical head control method for controlling an optical head adapted to form a main spot and a pair of side spots onto an optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the method comprising: a light spot moving direction judging step including: a first computing step of computationally producing the difference signal of the two signals obtained by detecting the quantity of light of the reflected light coming from the main spot by means of two divided detecting regions; a second computing step of computationally producing the difference signal of the two signals obtained by detecting the quantity of light of the reflected light coming from one of the side spots by means of two divided detecting regions; a third computing step of computationally producing the difference signal of the two signals obtained by detecting the quantity of light of the reflected light coming from the other side spots by means of two divided detecting regions; a fourth computing step of computationally producing the difference signal of the difference signal computationally produced from the second computing step and the difference signal computationally produced from the third computing step; a first binarizing step of binarizing the difference signal of the main spot computationally produced from the first computing step; a second binarizing step of binarizing the difference signal of the difference signals of the two side spots computationally produced from the fourth computing step; a judging step of judging the moving direction of the main spot on the basis of the binarized data from the first binarizing step and the binarized data from the second binarizing step; and a control step of controlling the position of the optical head in a radial direction of the optical disc on the basis of the moving direction of the main spot as judged in the light spot moving direction judging step, said optical head irradiating the main spot onto the optical disc.

With the optical head control method, the moving direction of the main spot is judged in the judging step of the light spot moving direction judging step on the basis of the binarized data of the difference signal of the main spot from the first binarizing step and the binarized data of the difference signal of the difference signals of the two side spots from the second binarizing step.

In still another aspect of the invention, there is provided an optical disc recording/replay apparatus for recording data on and reproducing data from an optical disc by forming a main spot of a light beam and a pair of side spots of light beams on an optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the device comprising: a light spot moving direction judging device having: a first computing means for computationally producing the difference signal of the two signals obtained by detecting the quantity of light of the reflected light coming from the main spot by means of two divided detecting regions; a second computing means for computationally producing the difference signal of the two signals obtained by detecting the quantity of light of the reflected light coming from the one side spot by means of two divided detecting regions; a first binarizing means for binarizing the difference signal of the main spot computationally produced by the first computing means; a second binarizing means for binarizing the difference signal of the side spot computationally produced by the second computing means; a judging means for judging the moving direction of the main spot on the basis of the binarized data from the first binarizing means and the binarized data from the second binarizing means; and a control means for controlling the position of the optical head in a radial direction of the optical disc on the basis of the moving direction of the main spot as judged by the light spot moving direction judging device, said optical head irradiating light beams onto the optical disc.

In a further aspect of the invention, There is provided an optical disc recording/replay apparatus for recording data on and reproducing data from an optical disc by forming a main spot of a light beam and a pair of side spots of light beams on an optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the device comprising: a light spot moving direction judging device having: a first computing means for computationally producing the difference signal of the two signals obtained by detecting the quantity of light of the reflected light coming from the main spot by means of two divided detecting regions; a second computing means for computationally producing the difference signal of the two signals obtained by detecting the quantity of light of the reflected light coming from one of the side spots by means of two divided detecting regions; a third computing means for computationally producing the difference signal of the two signals obtained by detecting the quantity of light of the reflected light coming from the other side spots by means of two divided detecting regions; a fourth computing means for computationally producing the difference signal of the difference signal computationally produced by the second computing means and the difference signal computationally produced by the third computing means; a first binarizing means for binarizing the difference signal of the main spot computationally produced by the first computing means; a second binarizing means for binarizing the difference signal of the difference signals of the two side spots computationally produced by the fourth computing means; a judging means for judging the moving direction of the main spot on the basis of the binarized data from the first binarizing means and the binarized data from the second binarizing means; and a control means for controlling the position of the optical head in a radial direction of the optical disc on the basis of the moving direction of the main spot as judged by the light spot moving direction judging device, said optical head irradiating light beams onto the optical disc.

An optical disc recording/replay apparatus according to the invention judges the radial moving direction of a light spot on an optical disc by using only difference signals without using any sum signal and records data on or reproduces data from the optical disc, accurately radially moving the optical head according to the user's intention on the basis of the judgment.

BEST MODE FOR CARRYING OUT THE INVENTION

Figure 1:
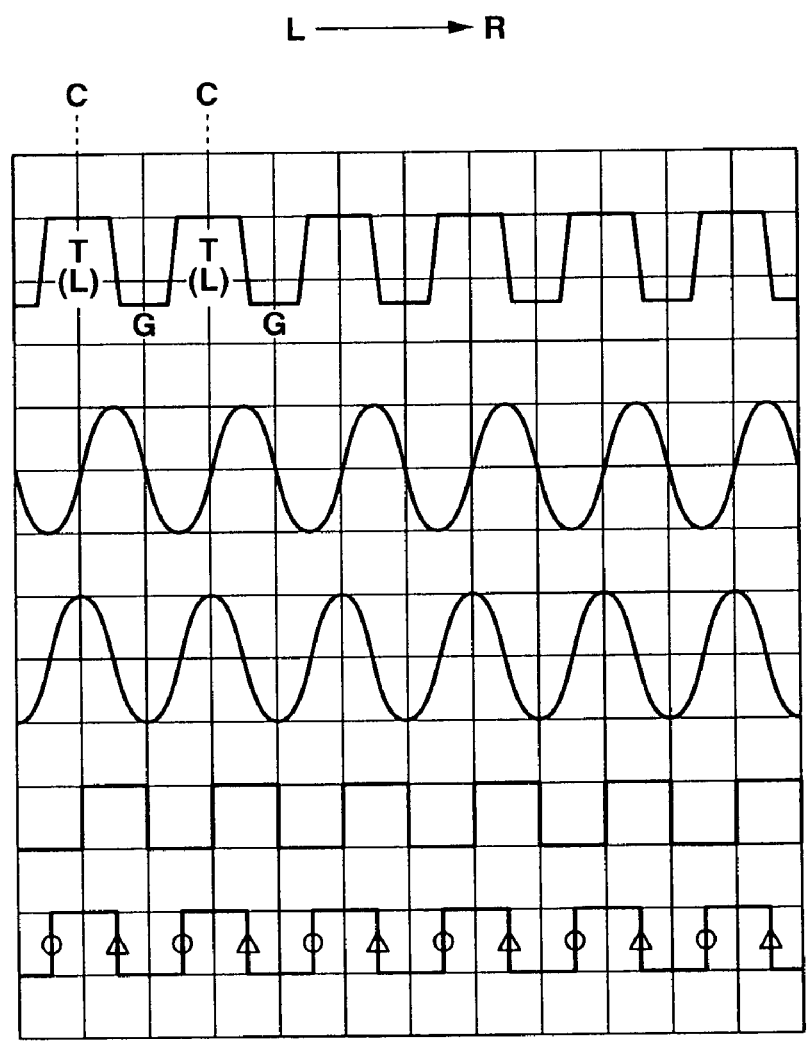
FIG. 1 shows graphs illustrating the principle of judging the moving direction of a light spot on a conventional optical disc.
Figure 2:
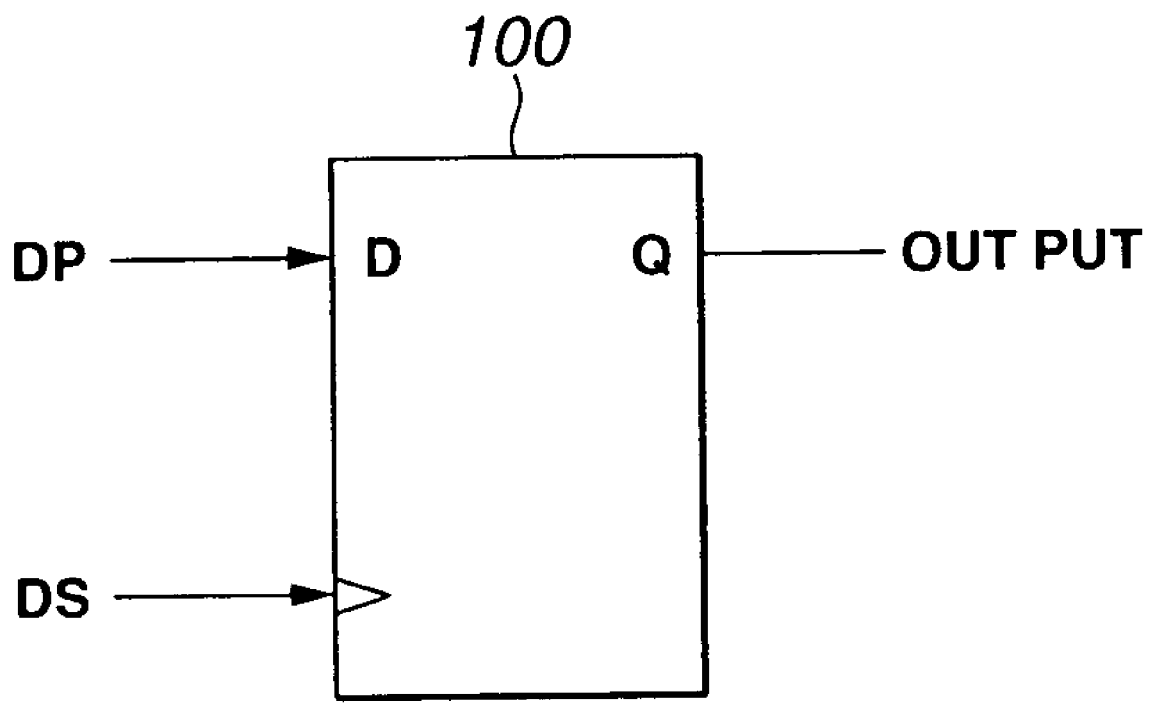
FIG. 2 is a schematic circuit diagram of a D flip-flop circuit for judging the moving direction of a light spot on a conventional optical disc.

Now, the present invention will be described in greater detail by referring to the accompanying drawings that illustrate preferred embodiments of the invention.

Firstly, the first embodiment of light spot moving direction judging device will be described along with the light spot moving direction judging method according to the invention that is to be used with the embodiment.

This embodiment of light spot moving direction judging device is contained in the optical head control device of a magneto-optical disc recording/replay apparatus for recording data on and reproducing data from a magneto-optical disc. It is adapted to determine the moving direction of the light spot formed on a magneto-optical disc by a light beam such as a laser beam that is irradiated from the optical head onto the magneto-optical disc and moving radially on the disc.

Assume that the user gives an instruction to the magneto-optical disc recording/replay apparatus so as to make the optical head jump a number of tracks and reproduce data from a wanted track. Then, the light spot formed by the optical head has to be moved radially from the track currently irradiated by the light spot by the number of tracks. Thus, the optical head control device supplies the sliding motor and the objective lens with an electric current so as to radially move the light spot. At this time, however, the direction in which the sliding motor and the objective lens are intended to be driven to move and the actual moving direction of the light spot do not necessarily agree with each other because of the backlash of the sliding motor and the objective lens. Then, it is no longer possible for the optical head control device to grasp the current position of the light spot and carry out subsequent operations including extraction of address data and controlling the tracking operation.

Therefore, it is necessary to provide a light spot moving direction judging device for constantly detecting the direction in which the light spot crosses the track and keep it operating whenever the sliding motor and the objective lens are driven to move.

It should be noted here that the first embodiment of light spot moving direction judging device may have two versions that are different from each other in terms of the signal of the light spot that is selected from the three light spots formed by the optical head on the magneto-optical disc for use. The first version utilizes the difference signal of the main spot and that of one of the two side spots, while the second version utilizes the difference signal of the main spot and the subtraction signal of the difference signals of the two side spots. These two versions will be described in greater detail hereinafter.

Firstly, the magneto-optical disc on which the moving direction of the light spot is determined by the light spot moving direction judging device will be described by referring to FIG. 3. The magneto-optical disc 1 has helical grooves G1, G2 of two different types that are running along recording tracks T (lands L) and different from each other in terms of depth. The recording tracks T are arranged at a pitch of 0.55 μm.

Assume here that a laser beam of a wavelength λ of 660 nm is irradiated onto a conventional magneto-optical disc having grooves whose depths are not differentiated from each other from an optical head comprising an objective lens with a numerical aperture NA of 0.52. Then, the cutoff fc of the optical system of the optical head is expressed by the formula below.

$$fc = 2NA/\lambda = 1575.75(/mm)$$

Thus, the track pitch Tc is expressed by the formula below.

$$Tc = 1/fc = 0.634(\mu m)$$

Therefore, it is not possible for the optical head to irradiate the magneto-optical disc 1 showing a track pitch Tc (=0.55) that is less than Tc=0.634, which is the permissible lower limit as determined from the cutoff (=1575.75) of the optical system, so as to form a light spot accurately at a right position. Then, it is not possible to reproduce any of the signals recorded on the magneto-optical disc 1 nor record signals on the magneto-optical disc 1.

The magneto-optical disc 1 is characterized in that a pair of grooves of two types that are different from each other in terms of depth are arranged oppositely to sandwich each recording track T. Therefore, a frequency component equal to ½ of the track pitch is typically generated. Then, it is possible to produce a tracking error signal typcially by using the ½ frequency component.

Figure 3:
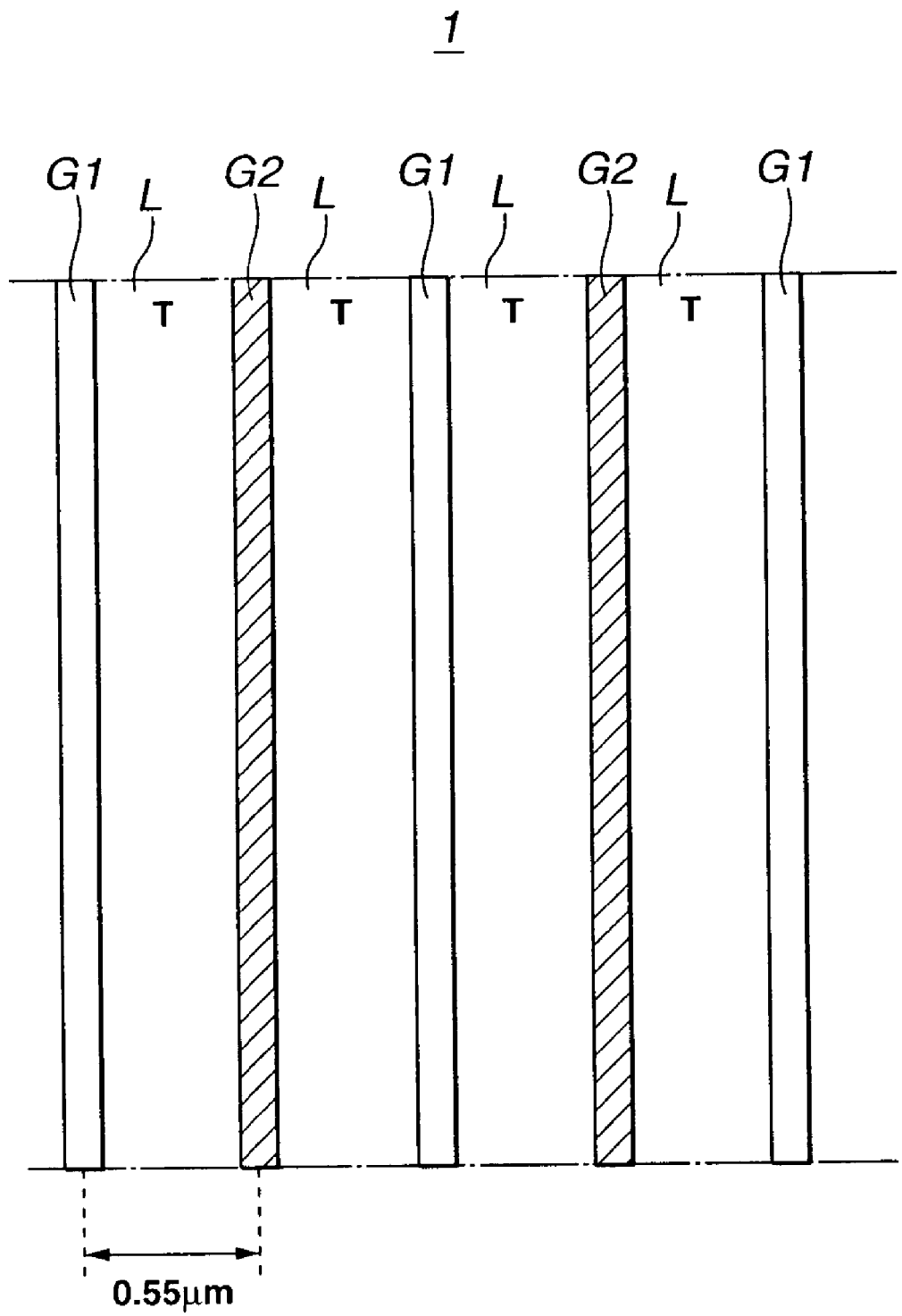
FIG. 3 is a schematic illustration of a magneto-optical disc on which the first embodiment of the invention, which is a light spot moving direction judging device.

Referring now to FIG. 3, the grooves G1 of the first type of the magneto-optical disc 1 has a depth of d1 that is smaller than the depth d2 of the grooves G2 of the second type. For instance, d1 may be 100 nm while d2 may be 170 nm.

Figure 4:
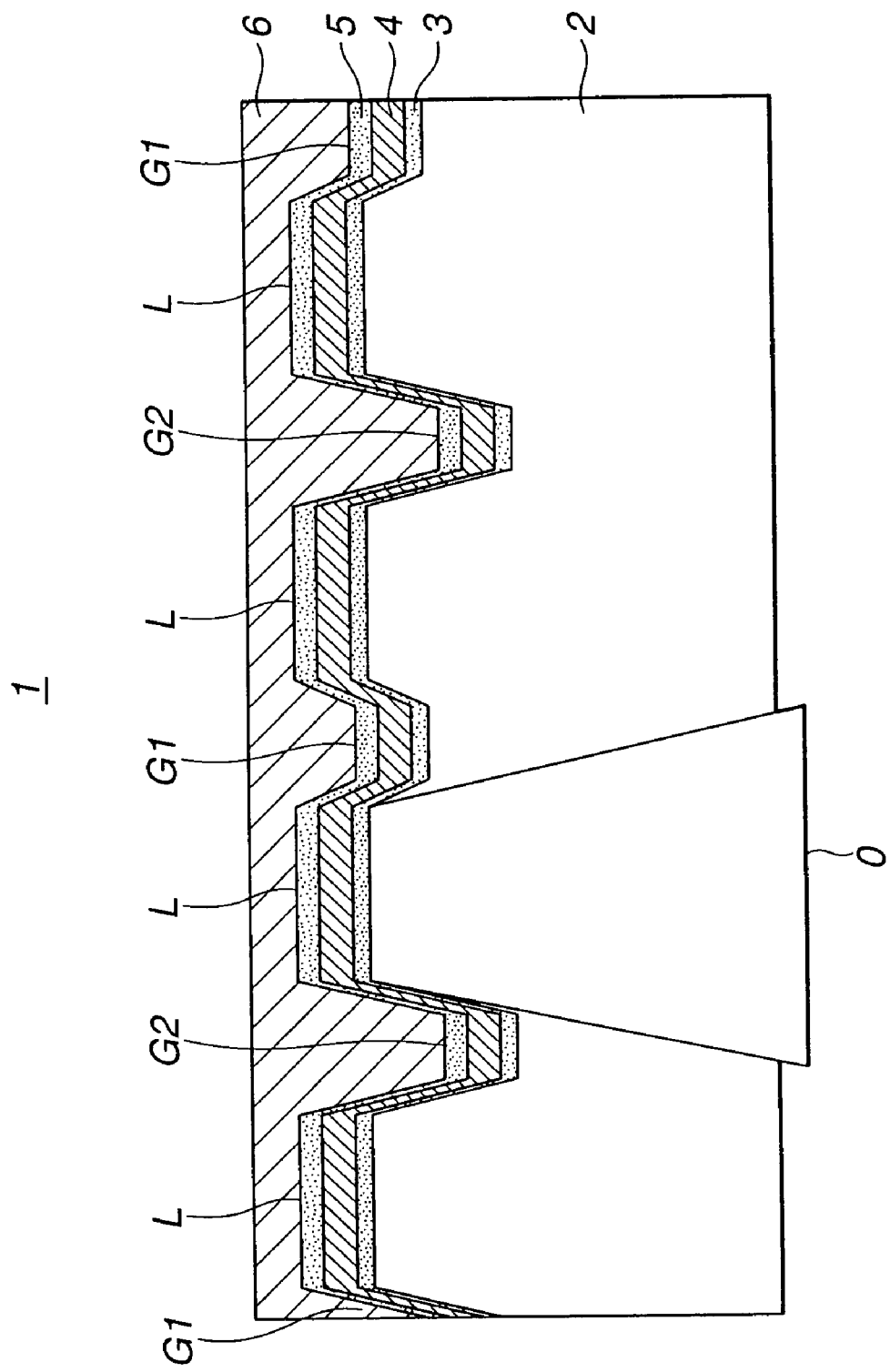
FIG. 4 is a schematic cross sectional view of the magneto-optical disc of FIG. 3.

FIG. 4 is a schematic cross sectional view of the magneto-optical disc 1 of FIG. 3. The magneto-optical disc 1 comprises a transparent substrate 2, a first dielectric film 3, a recording film 4, a second dielectric film 5 and a protection film 6 that are laid one on the other in the above mentioned order from the side of the disc for receiving the laser beam O to form a multilayer structure. The transparent substrate 2 is typically made of polymethylmetalate (PMMA), polycarbonate (PC) or the like. Both the first dielectric film 3 and the second dielectric film 5 are typically made of SiN or the like. The recording film 4 is typically made of a TeFeCo alloy or the like. The protection film 6 is typically made of ultraviolet-ray setting resin or the like.

Figure 5:
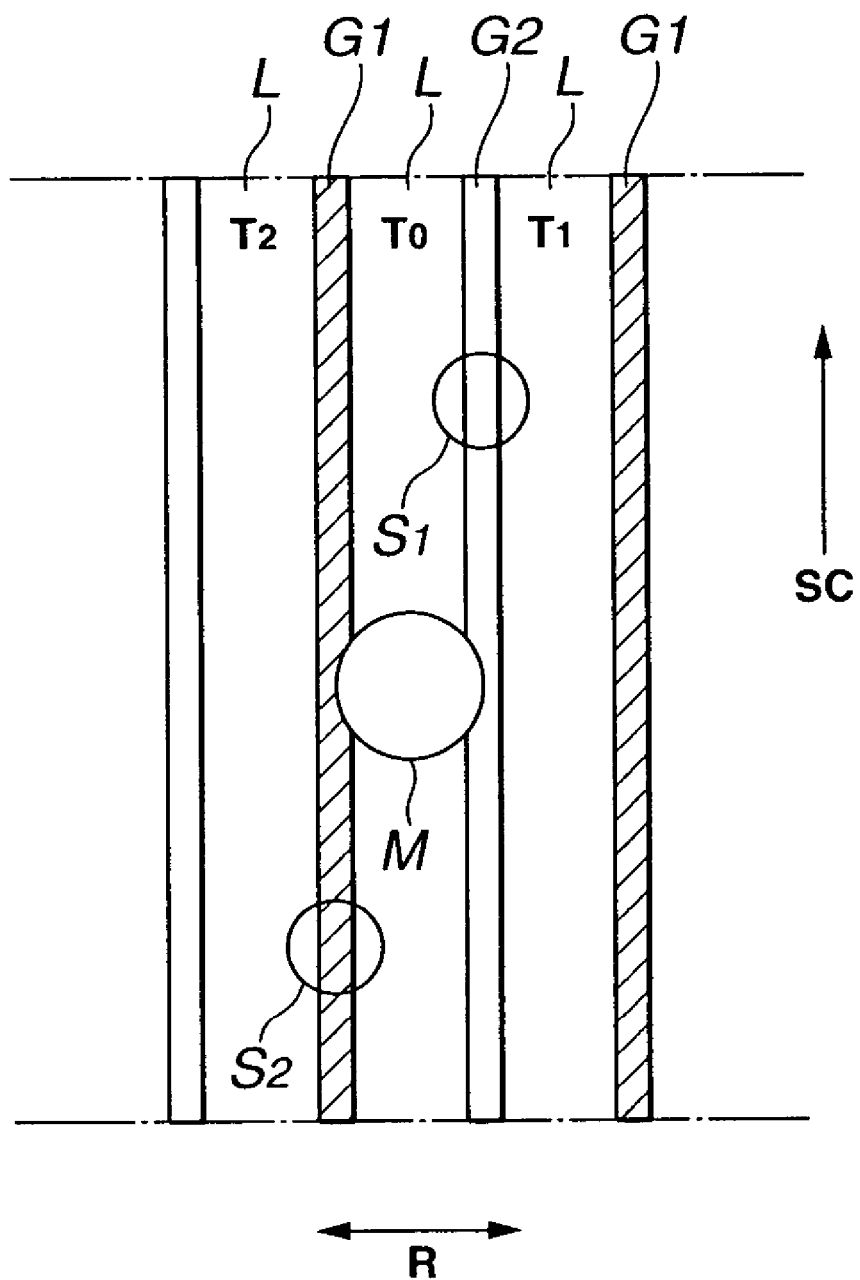
FIG. 5 is a schematic illustration of the three light spots formed on the magneto-optical disc of FIG. 3.

The optical head forms three light spots including a main spot M and two side spots S1, S2 as pointed out above on a magneto-optical disc 1 as illustrated in FIGS. 3 and 4 (see FIG. 5). The scanning positions of the two side spots S1, S2 are displaced in opposite directions by a ½ pitch relative to the scanning position of the main spot M. In other words, if the main spot M is on the track $T_0$, the two side spots S1, S2 are located respectively on the first groove G1 and the second groove G2 that are arranged oppositely to sandwich the track $T_0$.

Figure 6:
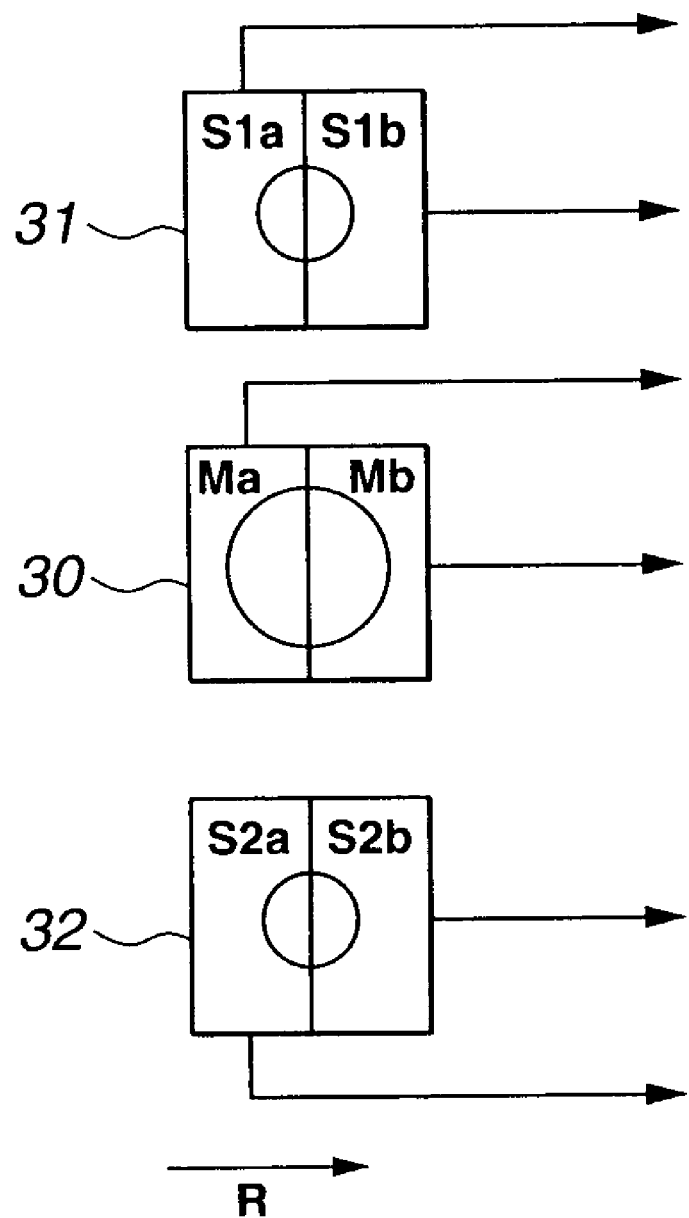
FIG. 6 is a schematic plan view of photodetectors adapted to detect the respective quantities of the reflected light beams coming from the three light spots of FIG. 5.

FIG. 6 is a schematic plan view of photodetectors adapted to detect the respective quantities of the reflected light beams coming from the three light spots M, S1 and S2 of FIG. 5. Referring to FIG. 6, the first photodetector 30 has two light detecting regions Ma, Mb produced by dividing the first photodetector 30 into two halves in a radial direction R of the magneto-optical disc 1, which regions are adapted to detect the quantity of the reflected light beam coming from the main spot M and output respective detection signals (to be respectively referred to as Ma and Mb hereinafter).

The second photodetector 31 also has two light detecting regions S1a, S1b produced by dividing the second photodetector 31 into two halves in the radial direction R of the magneto-optical disc 1, which regions are adapted to detect the quantity of the reflected light beam coming from the side spot S1 and output respective detection signals (to be respectively referred to as S1a and S1b hereinafter).

Similarly, the third photodetector 32 has two light detecting regions S2a, S2b produced by dividing the photodetector 31 into two halves in the radial direction R of the magneto-optical disc 1, which regions are adapted to detect the quantity of the reflected light beam coming from the side spot S2 and output respective detection signals (to be respectively referred to as S2a and S2b hereinafter).

Thus, the optical head comprises the first photodetector 30, the second photodetector 31 and the third photodetector 32, each of which supplies part or all of its detection signals to a light spot moving direction judging device, which will be described hereinafter, and also to an RF circuit and other circuits. The RF circuit generates a reproduction signal RF, a tracking error signal TE and a focussing error signal FE by using part or all of each of the detection signals it receives.

Now, the first embodiment of light spot moving direction judging device that is adapted to determine the moving direction of the light spots by using part of each of the detection signals will be described below. This light spot moving direction judging device determines the moving direction of the light spots by using the difference signal of the main spot M and that of one of the side spots S1, S2, or S1. It may be needless to say that the difference signal of the other side spot S2 may alternatively be used without any problem.

Figure 7:
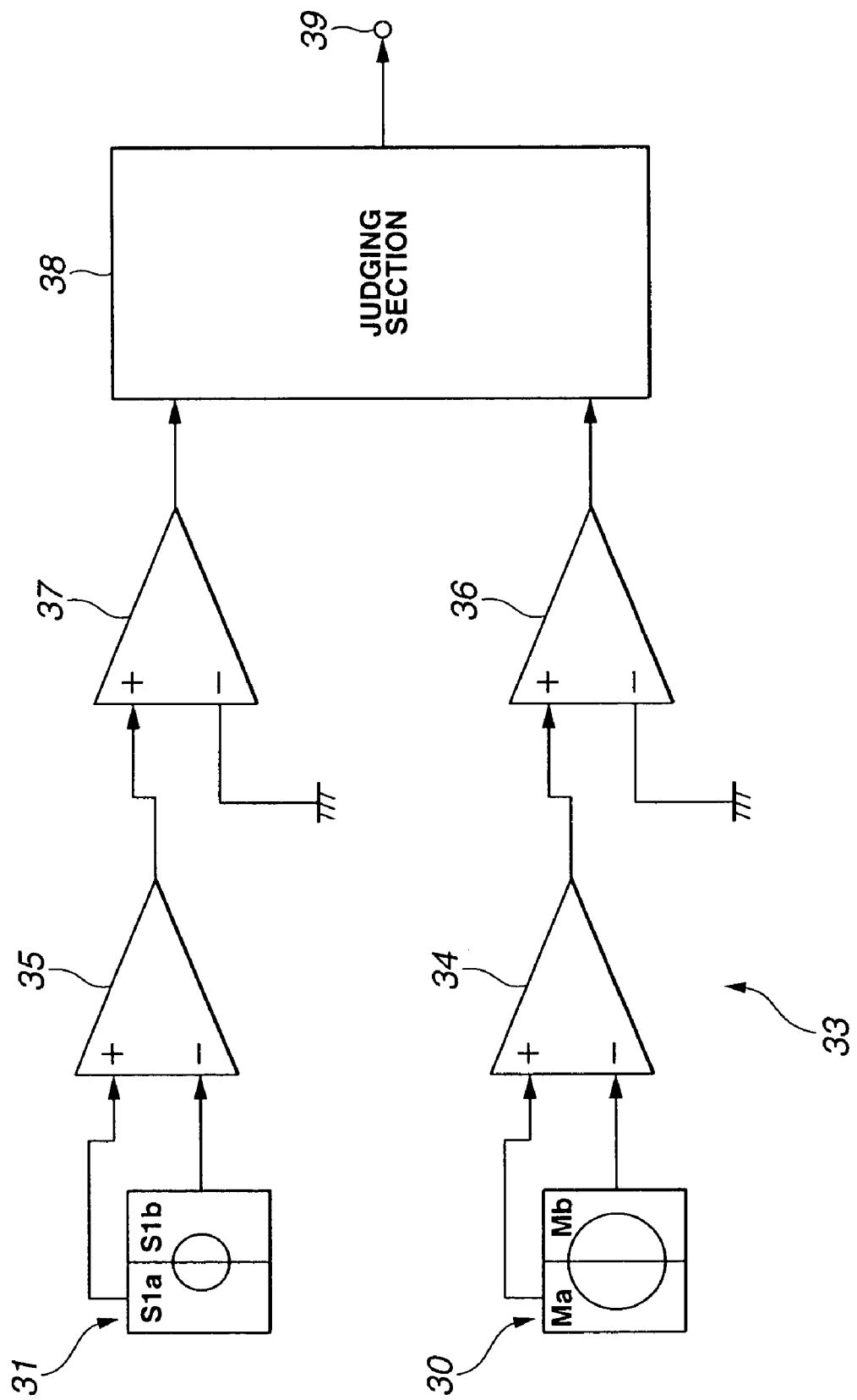
FIG. 7 is a schematic circuit diagram of the first version of the first embodiment of light spot moving direction judging device according to the invention.

Referring now to FIG. 7, the light spot moving direction judging device comprises a differential amplifier 34 for computationally obtaining the difference signal Ma–Mb of the detection signal Ma and the detection signal Mb obtained by the first photodetector 30, another differential amplifier 35 for computationally obtaining the difference signal S1a–S1b of the detection signal S1a and the detection signal S1b obtained by the second photodetector 31, a comparator 36 for binarizing the difference signal Ma–Mb of the main spot M, another comparator 37 for binarizing the difference signal S1a–S1b of the side spot S1 and a judging section 38 for determining the moving direction of the main spot M on the basis of the binarized data from the comparator 36 and the binarized data from the comparator 37.

The detection signal Ma and the detection signal Mb generated respectively by light detecting region Ma and the light detecting region Mb of the first photodetector 30 are input respectively to the positive input terminal + and the negative input terminal – of the differential amplifier 34. The differential amplifier 34 amplifies the input voltage difference of the detection signal Ma and the detection signal Mb and outputs Ma–Mb. The detection signal S1a and the detection signal S1b generated respectively by the light detecting region S1a and the light detecting region S1b of the second photodetector 31 are input respectively to the positive input terminal + and the negative input terminal – of the differential amplifier 35. The differential amplifier 35 amplifies the input voltage difference of the detection signal S1a and the detection signal S1b and outputs S1a–S1b.

The comparator 36 receives the output signal Ma–Mb of the differential amplifier 34 at the positive input terminal + thereof and compares it with 0 V. Then, it supplies the binarized data of the difference to the judging section 38. The comparator 37 receives the output signal S1a–S1b of the differential amplifier 35 at the positive input terminal + thereof and compares it with 0 V. Then, it supplies the binarized data of the difference to the judging section 38.

Figure 8:
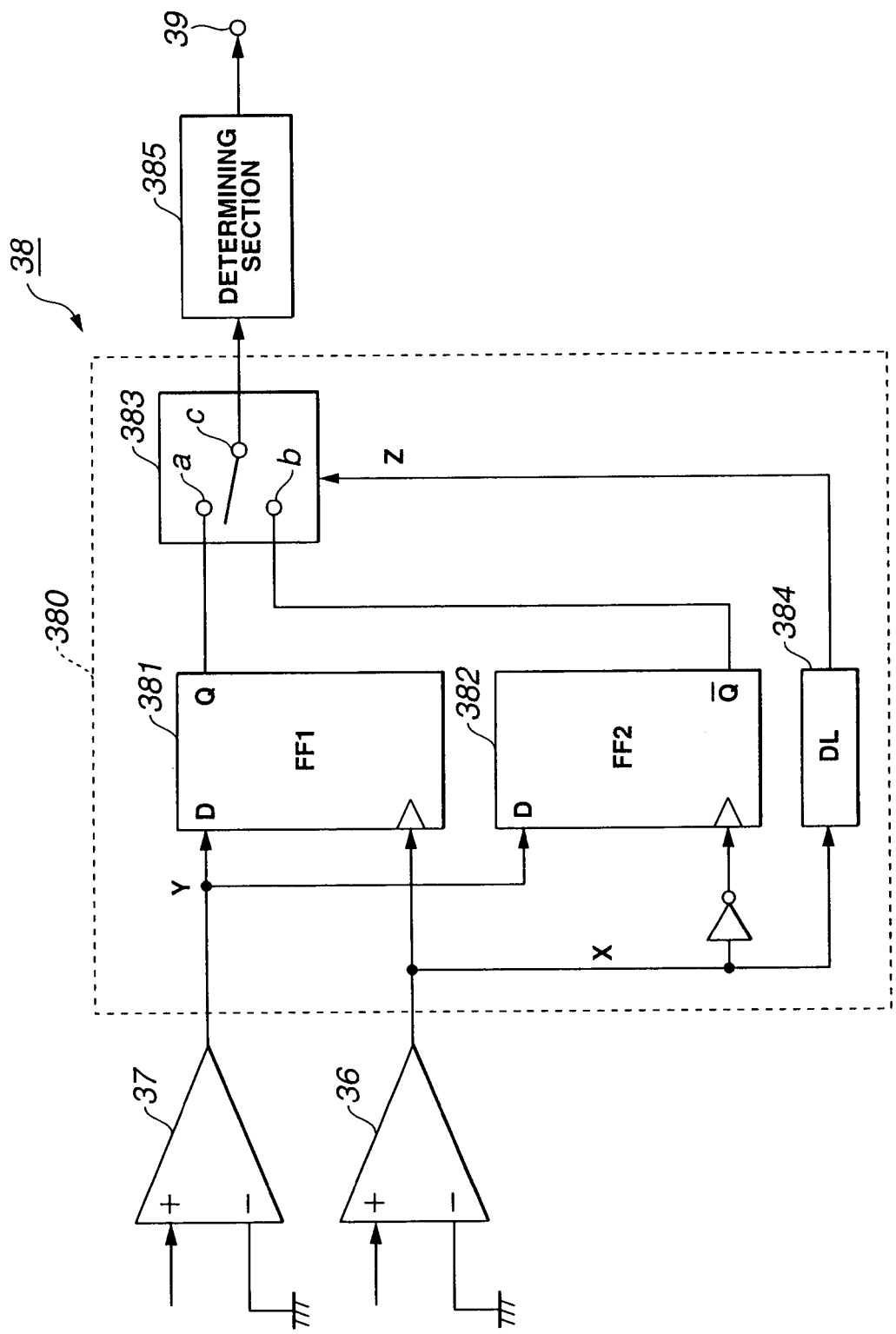
FIG. 8 is a schematic circuit diagram of the judging section of the first version of the first embodiment of light spot moving direction judging device according to the invention, which is a principal section of the device.

As shown in FIG. 8, the judging section 38 comprises a judgment data generating section 380 and a determining section 385. The judgment data generating section 380 generates judgment data to be used for judging the moving direction of the main spot M and the determining section 385 determines the moving direction of the main spot on the basis of the judgment data generated by the judgment data generating section 380.

The judgment data generating section 380 comprises two D flip-flop circuits 381, 382 and a changeover switch 383 for selecting either the output data Q of one of the D flip-flop circuits, or the D flip-flop circuit 381, or the inverted output data $\overline{Q}$ of the other D flip-flop circuit 382 on the basis of L or H of the binarized data of the comparator 36 and outputting the selected data. Note that the binarized data supplied from the comparator 36 to the changeover switch 383 is delayed by a delay circuit 384 typically by about d=10 ns.

The D flip-flop circuit 381 synchronizes the binarized data supplied from the comparator 37 to the data input terminal D thereof with a rising edge of the binarized data supplied from the comparator 36 to the clock input terminal thereof, using the latter binarized data as clock pulse, and supplies the former binarized data to the changeover switch 383 as its output data Q.

The D flip-flop circuit 382 synchronizes the binarized data supplied from the comparator 37 to the data input terminal D thereof with the falling edge of the binarized data supplied from the comparator 36 to the clock input terminal thereof, using the latter binarized data as clock pulse, and supplies the former binarized data to the changeover switch 383 as its output data $\overline{Q}$.

The output data Q from the D flip-flop circuit 381 is supplied to to-be-selected terminal a of the changeover switch 383, whereas the inverted output data $\overline{Q}$ from the D flip-flop circuit 382 is supplied to to-be-selected terminal b of the changeover switch 383. The changeover switch 383 additionally comprises a selection piece c, which is selectively connected either to the to-be-selected terminal a or to the to-be-selected terminal b on the basis of the delayed binarized data (changeover control signal) from the comparator 36. For example, it may be so arranged that the to-be-selected terminal b is selected if the binarized data (changeover control signal) Z is at H, whereas the to-be-selected terminal a is selected if the binarized data Z is at L. As the selection piece c is connected either to the to-be-selected terminal a or to the to-be-selected terminal b, the output data Q from the D flip-flop circuit 381 of the inverted output data $\overline{Q}$ from the D flip-flop circuit 382, whichever appropriate, is supplied to the determining section 385 as judgment data.

The determining section 385 is provided internally in advance with a table of binarized data "H" and "L" that correspond to the moving directions of the light spots for the purpose of determining the radial moving direction of the light spots on the magneto-optical disc. Thus, as the determining section 385 receives the judgment data, "H" or "L", from the judgment data generating section 380, it can determine the radial moving direction of the light spots on the magneto-optical disc by referring to the table. Then, the result of judgment of the determining section 385 on the moving direction of the light spots is output by way of output terminal 39.

Figure 9:
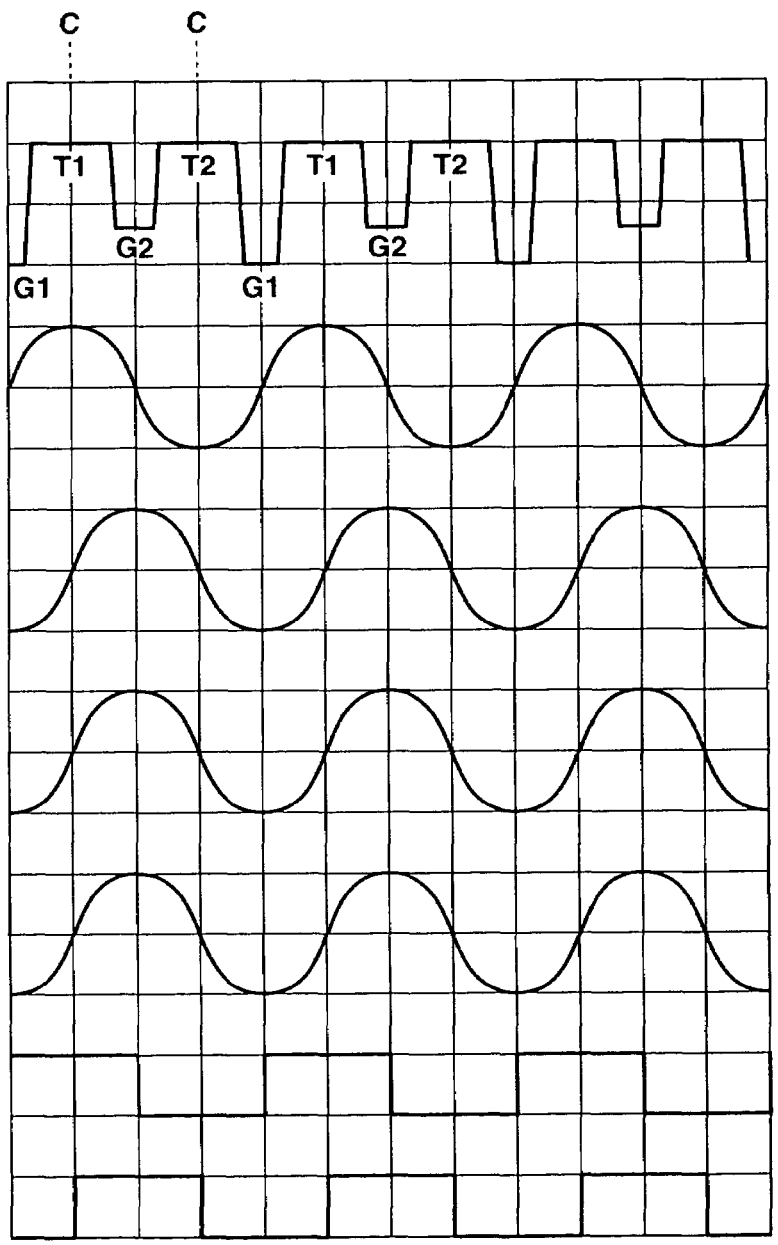
FIG. 9 shows graphs illustrating the operation of the first version of the first embodiment of light spot moving direction judging device according to the invention.

Now, the operation of the first version of the first embodiment of light spot moving direction judging device will be described in detail by referring to FIG. 9. FIG. 9 shows the waveform b of the difference signal obtained from the main spot M, the waveform c of the sum signal obtained from the main spot M, the waveform d of the difference signal obtained from the side spot S1, the waveform e of the difference signal DSPP of the difference signals of the two side spots S1, S2, both of which are used in the second version as will be described hereinafter, the waveforms b, c, d and e being related to the depths a of the grooves G as measured from the lands L (tracks T) of the magneto-optical disc 1, binarized data f obtained by binarizing the difference signal obtained from the main spot M and the binarized data g obtained by binarizing the difference signal obtained from the side spot S1 or the difference signal DSPP.

Referring to FIG. 9, while the waveform b of the difference signal and the waveform c of the sum signal are slightly different from those of known magneto-optical discs because the magneto-optical disc 1 is adapted to be used with the shallow and deep method, they are same as the corresponding waveforms of FIG. 1 in terms of that the phases of the two waveforms are displaced from each other by 90 degrees. Therefore, in principle, the conventional method of judging the moving direction may be used for the purpose of the present invention.

However, it should be noted that the conventional method can be used for the purpose of the invention only when both the difference signal and the sum signal have a sufficient signal volume. For example, when one of each pair of grooves has a depth of 100 nm and the other groove has a depth of 170 nm, the difference signal may be generated with a sufficient signal volume but the sum signal is practically not generated. Therefore, a method using the sum signal is not recommendable for a drive that may be used for such a disc.

In view of this fact, the first version of the first embodiment of the invention, which is a light spot moving direction judging device, is adapted to use the difference signal of the side spot S1 as shown by d in FIG. 9.

The difference signal PP (main) of the main spot M and the difference signals PP (side1) and PP (side2) of the two side spots S1, S2 are expressed respectively by formulas (1), (2) and (3) below;

$$PP(\text{main}) = a + b^* \sin(2\pi u / 2Tp) \quad (1),$$

$$PP(\text{side1}) = (\tfrac{1}{2}k)\{a + b^* \sin(2\pi(u+q)/2Tp)\} \quad (2)$$

and $$PP(\text{side2}) = (\tfrac{1}{2}k)\{a + b^* \sin(2\pi(u-q)/2Tp)\} \quad (3),$$

where a is the component generated due to the positional displacement of the disc cue and that of the detectors, u is the coordinate in the radial direction, q is the distance between the main spot and the side spots in the radial direction, Tp is the track pitch and the ratio of the quantity of light of the main spot and that of each of the side spots is k.

The difference signals are different from the difference signal of the conventional optical disc as indicated by b in FIG. 1 in the following two points.

The sine curve has a cycle period equal not to the track pitch Tp but to 2Tp (two tracks are used as unit).

When the main spot M is located at the center of a track, PP (main) is not equal to 0 and maximum MAX is reduced to minimum MIN.

If q in the formula (2) is equal to Tp/2, equation (4) below holds true.

$$PP(\text{side1}) = \tfrac{1}{2}k\{a - b^* \cos(2\pi u / 2Tp)\} \quad (4)$$

The difference signal PP (side1) of the side spot S1 shown by the formula (4) is also expressed by the graph d in FIG. 9. As seen from FIG. 9, the difference signal PP (side1) is displaced from the difference signal b of the main spot M by 90 dgrees.

The difference signal PP (main) of the main spot M (b in FIG. 9) is same as Ma−Mb that is computationally determined by the differential amplifier 34. The difference signal PP (side1) of the side spot S1 (d in FIG. 9) is same as S1a−S1b that is computationally determined by the differential amplifier 35.

Then, the binarized data indicated by f in FIG. 9 is obtained as a result of binarizing the PP (main) indicated by b in FIG. 9 by means of the comparator 36. Similarly, the binarized data Y indicated by g in FIG. 9 is obtained as a result of binarizing the PP (side1) by means of the comparator 37.

Figure 10:
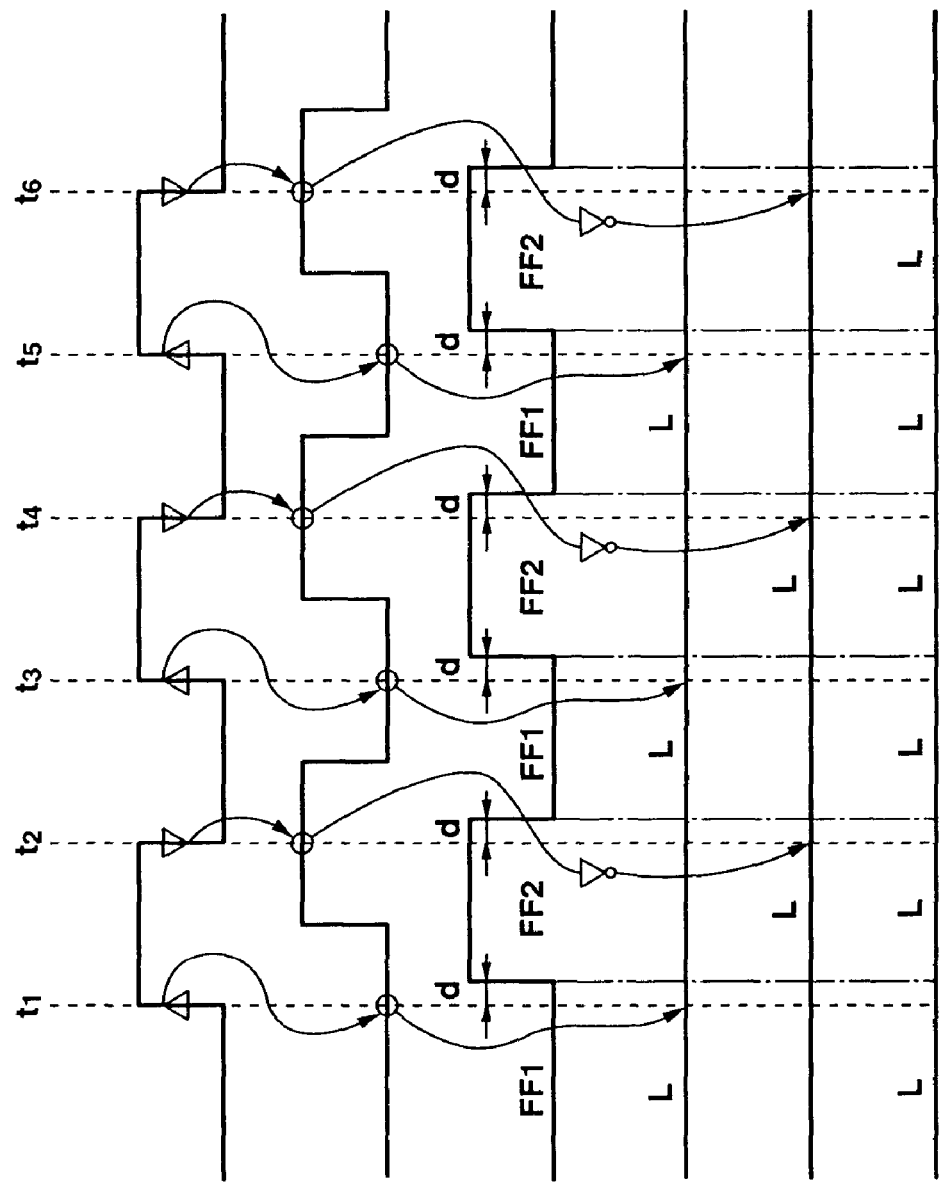
FIG. 10 shows graphs illustrating a judging operation of the first version of the first embodiment of light spot moving direction judging device according to the invention.
Figure 11:
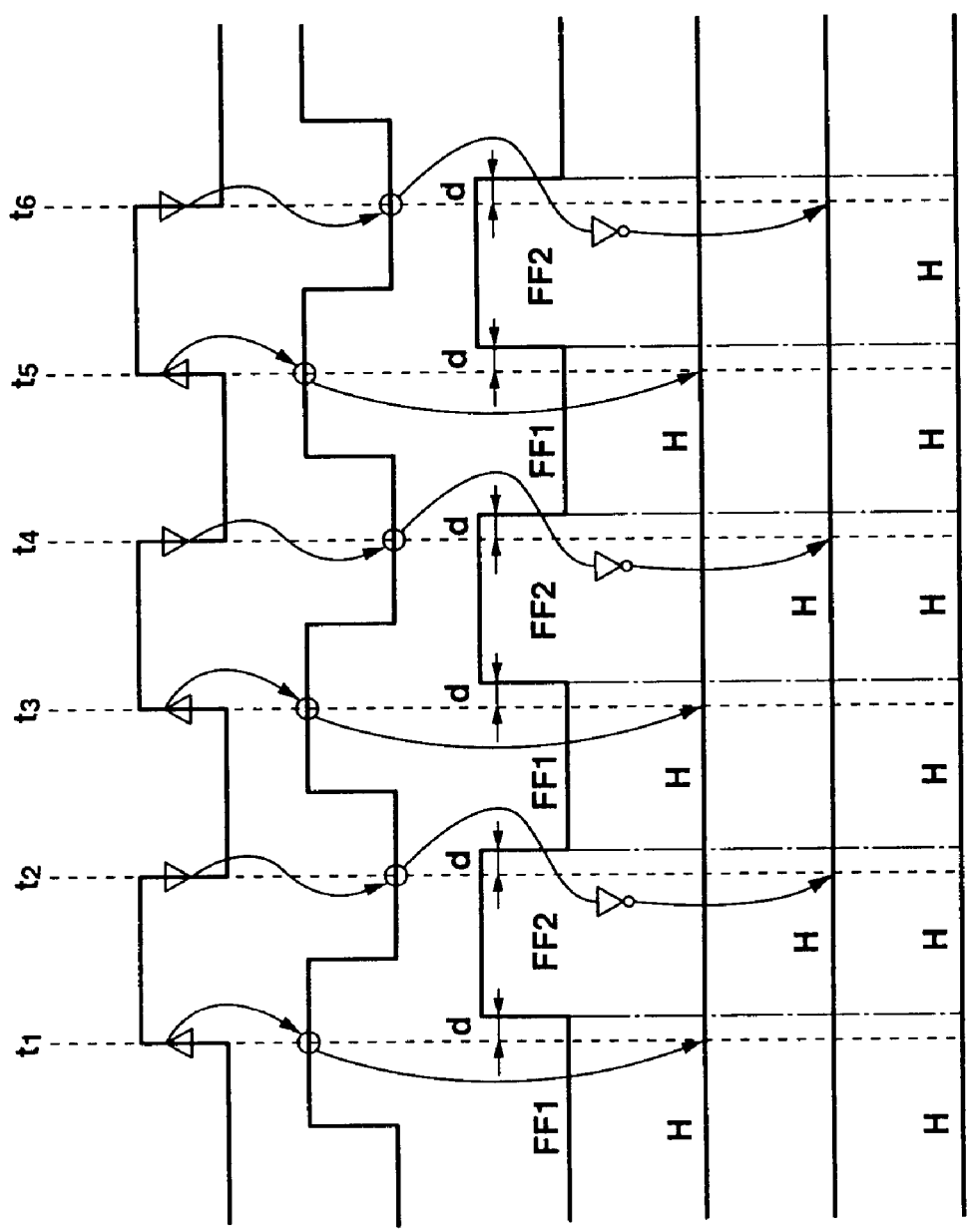
FIG. 11 shows graphs illustrating another judging operation of the first version of the embodiment of light spot moving direction judging device according to the invention.

Now, assume that the binarized data of the difference signal of the main spot M as indicated by f in FIG. 9 is expressed by X and the binarized data of the difference signal of the side spot S1 as indicated by g in FIG. 9 is expressed by Y. Referring now to FIGS. 10 and 11, the judging section 38 makes its judgment if the main spot M is moving from left L to right R (L to R) or from right R to left L (R to L) in FIGS. 10 and 11 on the basis of the binarized data X and Y and outputs the outcome of its judgement in a manner as described below. The determining section 385 of the judging section 38 is so adapted that it determines that the main spot M is moving (L to R) if judgment data "L" is supplied to it and that the main spot M is moving (R to L) if judgment data "H" is supplied to it.

Firstly, the operation of the judging section 38 will be described by referring to FIG. 10.

To begin with, the binarized data Y of b in FIG. 10 is at "L" before the first rising edge (timing t1) of the binarized data X of a in FIG. 10 that is used as clock pulse. Therefore, the output data Q (FF1out) of the D flip-flop circuit 381 (FF1) is "L" at this time as shown in FIG. 10. The control signal Z that is supplied from the delay circuit 384 to the changeover switch 383 for a changeover switching operation is delayed from the timing t1 by d as indicated by c in FIG. 10. Therefore, the changeover control signal Z is at "L" at the timing t1. Thus, the output data Q of the FF1 is selected by the changeover switch 383 and the judgment data generating section 380 outputs "L" as indicated by f in FIG. 10.

At the next timing t2, the binarized data Y that is synchronized with the first falling edge of the clock pulse (binarized data X) is at "H". At this time, the changeover control signal Z is at "H". Thus, the inverted output data Q⁻ of the FF2 that is obtained by inverting "H" of the binarized data Y is selected by the changeover switch 383 and the judging data generating section 380 outputs "L".

At the next timing t3, the binarized data Y that is synchronized with the next rising edge of the clock pulse is at "L". At this time, the changeover control signal Z is at "L". Thus, the judgment data generating section 380 outputs the output data Q of the FF1 that is "L" from its by way of the changeover switch 383.

At the following timing t4, the judging section 38 outputs "L" as at the timing t2. Similarly, the judging section 38 outputs "L" at the timing t5 as at the timing t3 and "L" at the timing t6 as at the timing t4.

Thus, in the condition as shown in FIG. 10, the judgment data generating section 380 keeps on outputting "L" so that the determining section 385 determines that the main spot M is moving from L to R as shown in FIG. 9.

Now, the operation of the judging section 38 will be described by referring to FIG. 11.

To begin with, the binarized data Y of b in FIG. 11 is at "H" before the first rising edge (timing t1) of the binarized data X of a in FIG. 11 that is used as clock pulse. Therefore, the output data Q (FF1out) of the D flip-flop circuit 381 (FF1) is "H" at this time as indicated by d in FIG. 11. The control signal Z that is supplied from the delay circuit 384 to the changeover switch 383 for a changeover switching operation is delayed from the timing t1 by d as indicated by c in FIG. 11. Therefore, the changeover control signal Z is at "L" at the timing t1. Thus, the output data Q of the FF1 is selected by the changeover switch 383 and the judgment data generating section 380 outputs "H" as indicated by f in FIG. 11.

At the next timing t2, the binarized data Y that is synchronized with the first falling edge of the clock pulse (binarized data X) is at "L". At this time, the changeover control signal Z is at "H". Thus, the inverted output data Q! of the FF2 that is obtained by inverting "L" of the binarized data Y is selected by the changeover switch 383 and the judging data generating section 380 outputs "H".

At the next timing t3, the binarized data Y that is synchronized with the next rising edge of the clock pulse is at "H". At this time, the changeover control signal Z is at "L". Thus, the judgment data generating section 380 outputs the output data Q of the FF1 that is "H" from its by way of the changeover switch 383.

At the following timing t4, the judgment data generating section 380 outputs "H" as at the timing t2. Similarly, the judgment data generating section 380 outputs "H" at the timing t5 as at the timing t3 and "L" at the timing t6 as at the timing t4.

Thus, in the condition as shown in FIG. 11, the judgment data generating section 380 keeps on outputting "H" so that the determining section 385 determines that the main spot M is moving from R to L as shown in FIG. 9.

Thus, the first version of the first embodiment of the invention, which is a light spot moving direction judging device, can determine the radial moving direction of the light spots by using the difference signal of the main spot and that of one of the side spots.

Now, the second version of the first embodiment of the invention, which is also a light spot moving direction judging device and adapted to judge the moving direction of light spots by using all the detection signals, will be described below. This second version of the first embodiment of light spot moving direction judging device determines the moving direction of light spots by using the difference signal of the main spot M and the subtraction signal of the difference signals of the two side spots.

Figure 12:
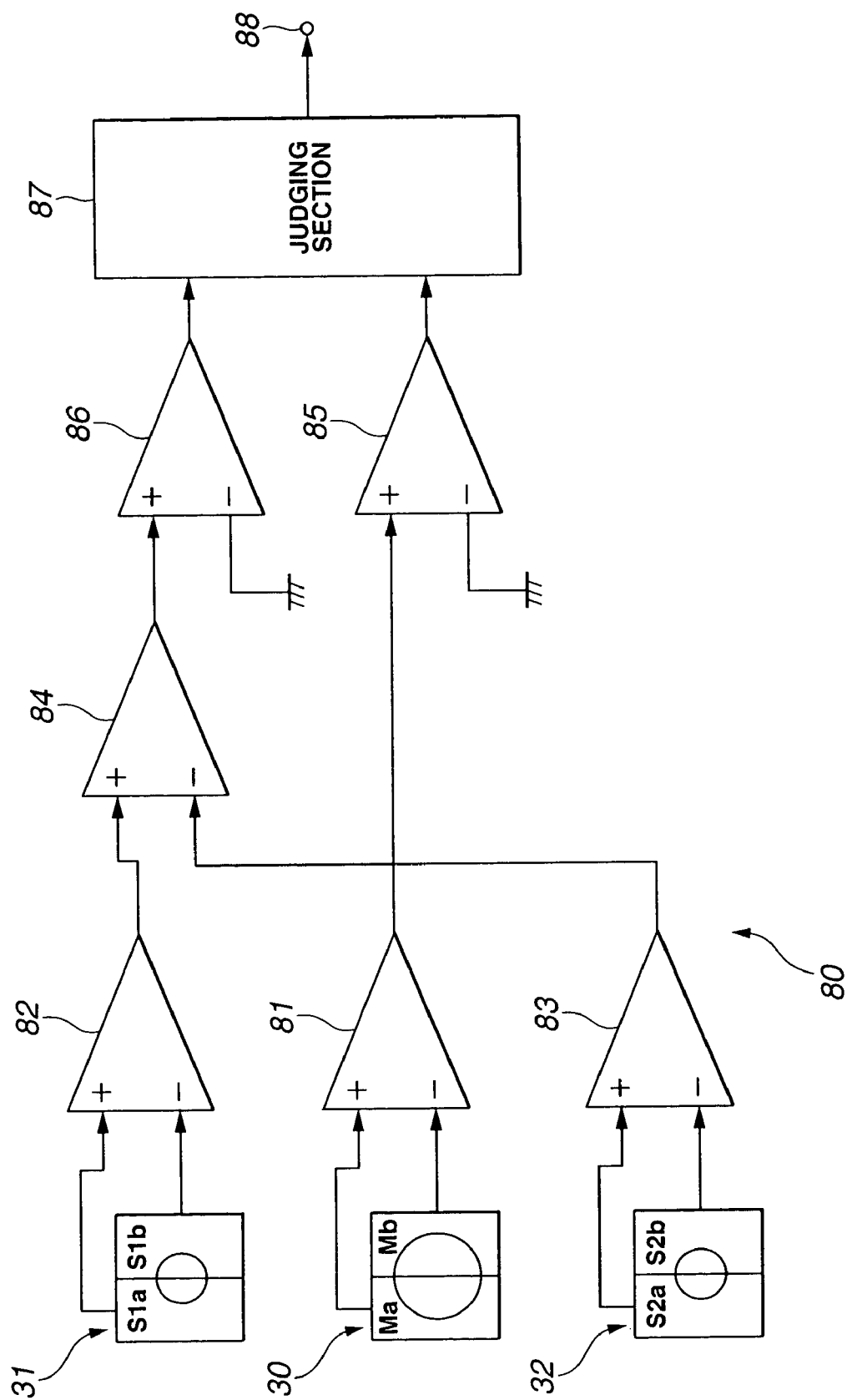
FIG. 12 is a schematic circuit diagram of the second version of the first embodiment of light spot moving direction judging device according to the invention.

As shown in FIG. 12, the second version of the first embodiment of light spot moving direction judging device comprises a differential amplifier 81 for computationally determining the difference signal Ma–Mb of the detection signal Ma and the detection signal Mb obtained by the first photodetector 30, a differential amplifier 82 for computationally determining the difference signal S1a–S1b of the detection signal S1a and the detection signal S1b obtained by the second photodetector 31, a differential amplifier 83 for computationally determining the difference signal S2a–S2b of the detection signal S2a and the detection signal S2b obtained by the third photodetector 32, a differential amplifier 84 for further computationally determining the difference signal of the difference signal S1a–S1b computed by the difference amplifier 82 and the difference signal S2a–S2b computed by the difference amplifier 83, a comparator 85 for binarizing the difference signal Ma–Mb of the main spot computed by the differential amplifier 81, another comparator 86 for binarizing the difference signal of the difference signals of the two side spots, or (S1a–S1b)–(S2a–S2b), as computed by the differential amplifier 84 and a judging section 87 for determining the moving direction of the main spot on the basis of the binarized data from the comparator 85 and the binarized data from the comparator 86.

The detection signal Ma and the detection signal Mb generated respectively by light detecting region Ma and the light detecting region Mb of the first photodetector 30 are input respectively to the positive input terminal + and the negative input terminal – of the differential amplifier 81. The differential amplifier 81 amplifies the input voltage difference of the detection signal Ma and the detection signal Mb and outputs Ma–Mb. The detection signal S1a and the detection signal S1b generated respectively by the light detecting region S1a and the light detecting region S1b of the second photodetector 31 are input respectively to the positive input terminal + and the negative input terminal – of the differential amplifier 82. The differential amplifier 82 amplifies the input voltage difference of the detection signal S1a and the detection signal S1b and outputs S1a–S1b. The detection signal S2a and the detection signal S2b generated respectively by the light detecting region S2a and the light detecting region S2b of the third photodetector 32 are input respectively to the positive input terminal + and the negative input terminal – of the differential amplifier 83. The differential amplifier 83 amplifies the input voltage difference of the detection signal S2a and the detection signal S2b and outputs S2a–S2b.

The difference signal S1a–S1b of the side spot S1 as computed by the differential amplifier 82 and the difference signal S2a–S2b of the side spot S2 as computed by the differential amplifier 83 are input respectively to the positive input terminal + and the negative input terminal – of the differential amplifier 84. The differential amplifier 84 amplifies the input voltage difference of the difference signal S1a–S1b and the difference signal S2a–S2b and outputs (S1a–S1b)–(S2a–S2b).

The comparator 85 receives the output signal Ma–Mb of the differential amplifier 81 at the positive input terminal + thereof and compares it with 0 V. Then, it supplies the binarized data of the difference to the judging section 87. The comparator 86 receives the output signal (S1a–S1b)–(S2a–S2b) of the differential amplifier 84 at the positive input terminal + thereof and compares it with 0 V. Then, it supplies the binarized data of the difference to the judging section 87.

Figure 13:
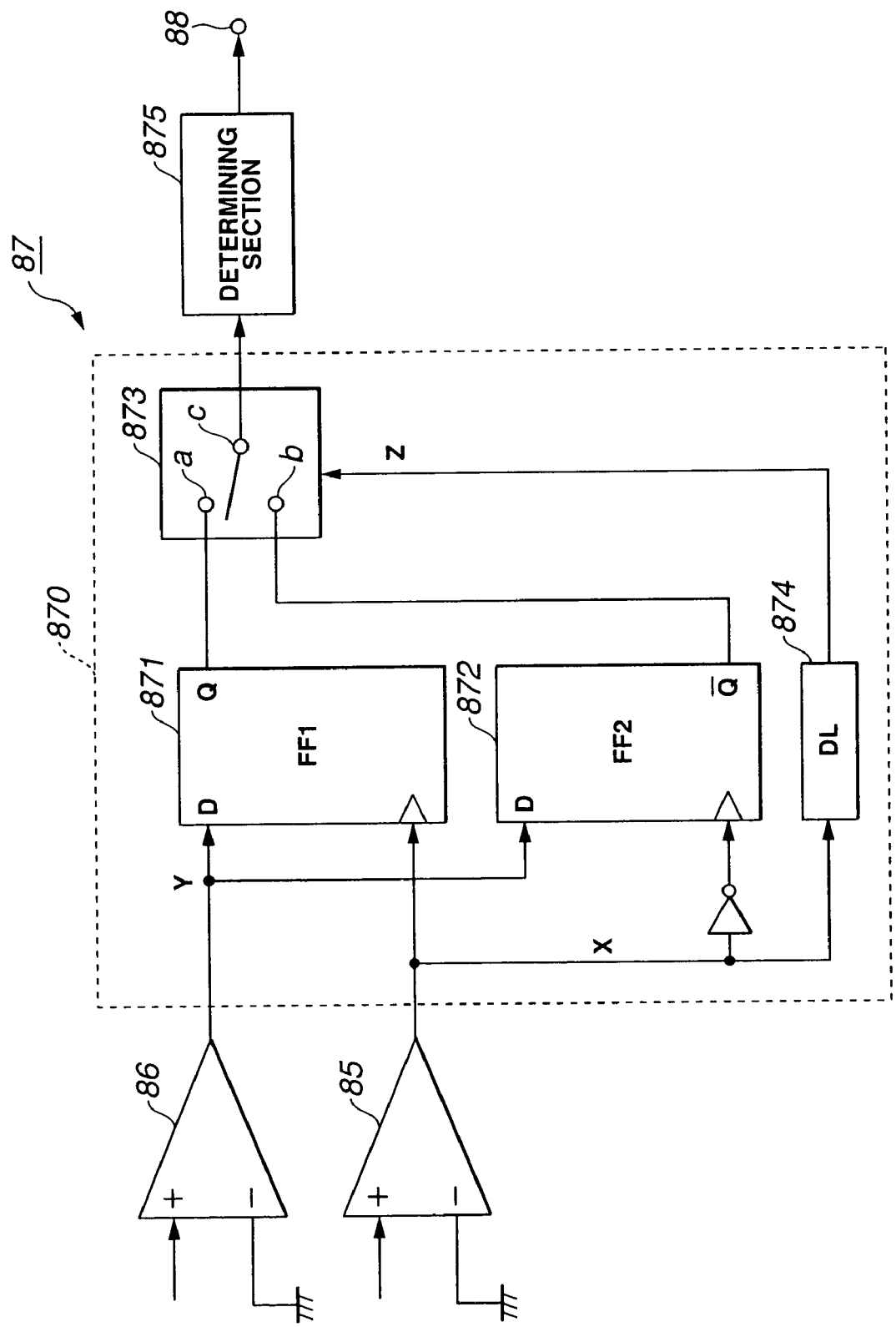
FIG. 13 is a schematic circuit diagram of the judging section of the second version of the first embodiment of light spot moving direction judging device according to the invention, which is a principal section of the device.

As shown in FIG. 13, the judging section 87 comprises a judgment data generating section 870 and a determining section 875. The judgment data generating section 870 generates judgment data to be used for judging the moving direction of the main spot M and the determining section 875 determines the moving direction of the main spot on the basis of the judgment data generated by the judgment data generating section 870.

The judgment data generating section 870 comprises two D flip-flop circuits 871, 872 and a changeover switch 873 for selecting either the output data Q of one of the D flip-flop circuits, or the D flip-flop circuit 871, or the inverted output data $\overline{Q}$ of the other D flip-flop circuit 872 on the basis of L or H of the binarized data of the comparator 85 and outputting the selected data. Note that the binarized data supplied from the comparator 85 to the changeover switch 873 is delayed by a delay circuit 874 typically by about d=10 ns.

The D flip-flop circuit 871 synchronizes the binarized data supplied from the comparator 86 to the data input terminal D thereof with a rising edge of the binarized data supplied from the comparator 85 to the clock input terminal thereof, using the latter binarized data as clock pulse, and supplies the former binarized data to the changeover switch 873 as its output data Q.

The D flip-flop circuit 872 synchronizes the binarized data supplied from the comparator 86 to the data input terminal D thereof with a falling edge of the binarized data supplied from the comparator 85 to the clock input terminal thereof, using the latter binarized data as clock pulse, and supplies the former binarized data to the changeover switch 873 as its output data $\overline{Q}$.

The output data Q from the D flip-flop circuit 871 is supplied to to-be-selected terminal a of the changeover switch 873, whereas the inverted output data $\overline{Q}$ from the D flip-flop circuit 872 is supplied to to-be-selected terminal b of the changeover switch 873. The changeover switch 873 additionally comprises a selection piece c, which is selectively connected either to the to-be-selected terminal a or to the to-be-selected terminal b on the basis of the delayed binarized data (changeover control signal) from the comparator 85. For example, it may be so arranged that the to-be-selected terminal b is selected if the binarized data (changeover control signal) Z is at H, whereas the to-be-selected terminal a is selected if the binarized data Z is at L. As the selection piece c is connected either to the to-be-selected terminal a or to the to-be-selected terminal b, the output data Q from the D flip-flop circuit 871 or the inverted output data $\overline{Q}$ from the D flip-flop circuit 872, whichever appropriate, is supplied to the determining section 875 as judgment data.

The determining section 875 is also provided internally in advance with a table of binarized data "H" and "L" that correspond to the moving directions of the light spots for the purpose of determining the radial moving direction of the light spots on the magneto-optical disc. Thus, as the determining section 875 receives the judgment data, or "H" or "L", from the judgment data generating section 870, it can determine the radial moving direction of the light spots on the magneto-optical disc by referring to the table. Then, the result of judgment of the determining section 875 on the moving direction of the light spots is output by way of output terminal 88.

Now, the operation of the second version of the first embodiment of light spot moving direction judging device will be described in detail by referring to FIG. 9. This second version of the first embodiment of light spot moving direction judging device uses difference signal DSPP (the difference between side spot push-pulls) in addition to the difference signals of the two side spots S1, S2.

The DSPP is expressed by formula (5) below, using the formulas (2) and (3) cited above;

$$DSPP = (b/k)*\sin(2\pi q/2Tp)\sin(2\pi u/2Tp) \quad (5),$$

where a is the component generated due to the positional displacement of the disc cue and that of the detectors, u is the coordinate in the radial direction, q is the distance between the main spot and the side spots in the radial direction, Tp is the track pitch and the ratio of the quantity of light of the main spot and that of each of the side spots is k.

As seen from FIG. 9, the DSPP as expressed by the formula (5) shows a phase shifted by 90 degrees from the difference signal PP (main) of the main spot M as expressed by the formula (1). It will be appreciated that the phase difference between the DSPP and the difference signal of the main spot M regardless of the value of the distance q between the main spot M and the side spots S1, S2 in the radial direction, although the distance q is ideally Tp/2, 3Tp/2, . . . because the value of q influences the amplitude of the DSPP signal.

The data obtained by binarizing the DSPP signal (e in FIG. 9) is equal to Y as indicated by g in FIG. 9.

With the second version of the first embodiment of light spot moving direction judging device, it is possible to determine the moving direction of the main spot M as described earlier by referring to FIGS. 9 and 11. Therefore, it will not be described any further.

Thus, as described above, the second version of the first embodiment of light spot moving direction judging device is adapted to determine the moving direction of the light spots by using the difference signal of the main spot and the difference signals of the side spots.

Now, the second embodiment of the invention will be described. The second embodiment of the invention is that of an optical head control device adapted to be used with an optical head control method according to the invention. The second embodiment of optical head control device can also have two versions because it can comprise either the first version or the second version of the above described embodiment of light spot moving direction judging device according to the invention. The optical head control device that comprises a light spot moving direction judging device having a configuration as illustrated in FIGS. 6 and 7 will be referred to as the first version, whereas the optical head control device that comprises a light spot moving direction judging device having a configuration as illustrated in FIGS. 12 and 13 will be referred to as the second version hereinafter.

Figure 14:
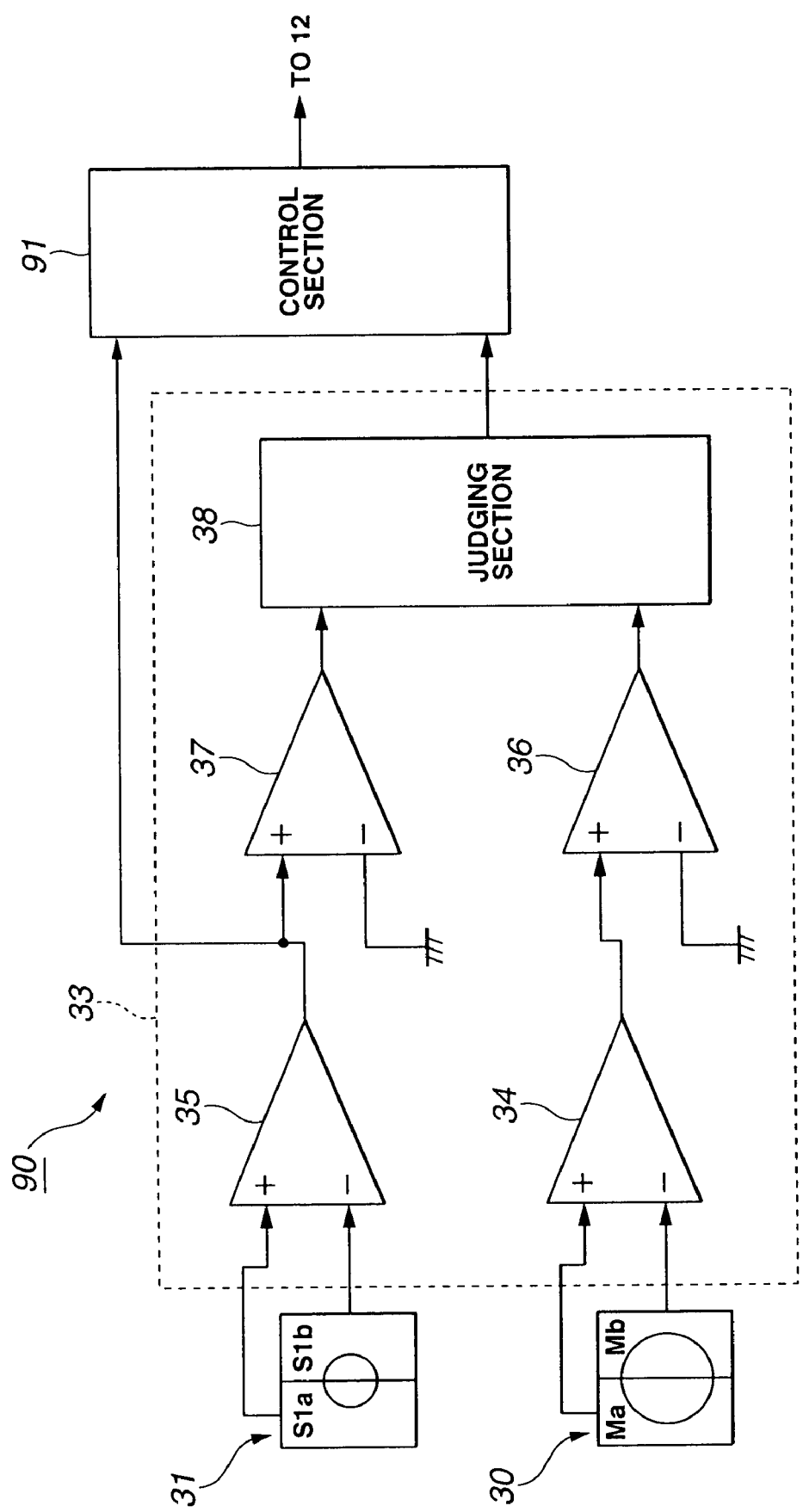
FIG. 14 is a schematic circuit diagram of the second version of the second embodiment of the invention, which is an optical head control device.

Firstly, the first version of the embodiment of optical head control device 90 will be described by referring to FIG. 14. The optical head control device 90 controls the radial position of an optical head that is adapted to irradiate three light spots as shown in FIG. 5 on a magneto-optical disc 1 as shown in FIGS. 3 and 4 and detect the quantity of light reflected by the magneto-optical disc 1 by means of three photodetectors as shown in FIG. 6.

Assume that the user gives an instruction to the magneto-optical disc recording/replay apparatus so as to make the optical head jump a number of tracks and reproduce data from a wanted track. Then, the optical head control device supplies the sliding motor and the objective lens with an electric current so as to radially move the light spot. At this time, however, the direction in which the sliding motor and the objective lens are intended to be driven to move and the actual moving direction of the light spot do not necessarily agree with each other because of the backlash of the sliding motor and the objective lens. Then, it is no longer possible for the optical head control device to grasp the current position of the light spot and carry out subsequent operations including extraction of address data and controlling the tracking operation.

Therefore, it is necessary for the optical head control device to contain a light spot moving direction judging device for constantly detecting the direction in which the light spot crosses the track and keep it operating whenever the sliding motor and the objective lens are driven to move.

Thus, the optical head control device 90 contains a light spot moving direction judging device 33 and controls the radial position of the optical head on the magneto-optical disc 1 by means of control section 91 on the basis of the moving direction of the light spots as determined by the light spot moving direction judging device 33.

More specifically, the optical head control device 90 determines the moving direction of the light spots by means of the light spot moving direction judging device 33 it contains and controls the sliding motor of the optical head by means of its control section 91 on the basis of its judgment on the moving direction of the light spot so as to move the optical head to a position close to the track wanted by the user. Then, the control section 91 of the optical head control device 90 causes the optical head to read the address of the track so as to move the light spots exactly on the wanted track and subsequently performs a tracking control operation.

Now, the tracking control operation of the control section 91 will be described below. The control section 91 is fed with the difference signal S1a–S1b of the side spot S1 coming from the differential amplifier 35 of the light spot moving direction judging device 33. Then, the control section 91 performs a tracking control operation, using the difference signal S1a–S1b of the side spot S1 computed by the differential amplifier 35 as tracking error signal TE.

Thus, the optical head control device 90 controls the tracking operation of the optical head relative to the magneto-optical disc 1 on the basis of the difference signal S1a–S1b of the two signals obtained by detecting the quantity of reflected light coming from at least one of the two side spots S1, S2, or the side spot S1, by means of the divided two light detecting regions S1a, S1b.

Now, the principle of the tracking control operation of the optical head control device 90, using a side spot, will be described below.

The optical head forms three light spots including a main spot M and two side spots S1, S2 as shown in FIG. 5 on a magneto-optical disc 1 as illustrated in FIGS. 3 and 4. The scanning positions of the two side spots S1, S2 are displaced in opposite directions by a ½ pitch relative to the scanning position of the main spot M. In other words, if the main spot M is on the track $T_h$, the two side spots S1, S2 are located respectively on the first groove G1 and the second groove G2 that are arranged oppositely to sandwich the track $T_h$. Then, the difference signal S1a–S1b of the side spot S1 is equal to 0. The behaviour of the difference signal of the side spot due to an off-track condition is substantially same as that of the difference signal of the main spot on a magneto-optical disc having ordinary tracks. Therefore, it can be used as tracking error signal.

Meanwhile, since the magneto-optical disc 1 is adapted to the shallow and deep method, the signal polarity varies depending on if the side spots are found on the first groove G1 or on the second groove G2. In other words, in a graph where the horizontal axis represents the coordinate in the radial direction u and the vertical axis represents the quantity of difference signal, the curve can show a rising slope or a falling slope in the graph. Since the control section 91 can grasp the polarity in advance, the optical head control device 90 can control the optical head without problem relative to the magneto-optical disc 1.

Figure 15:
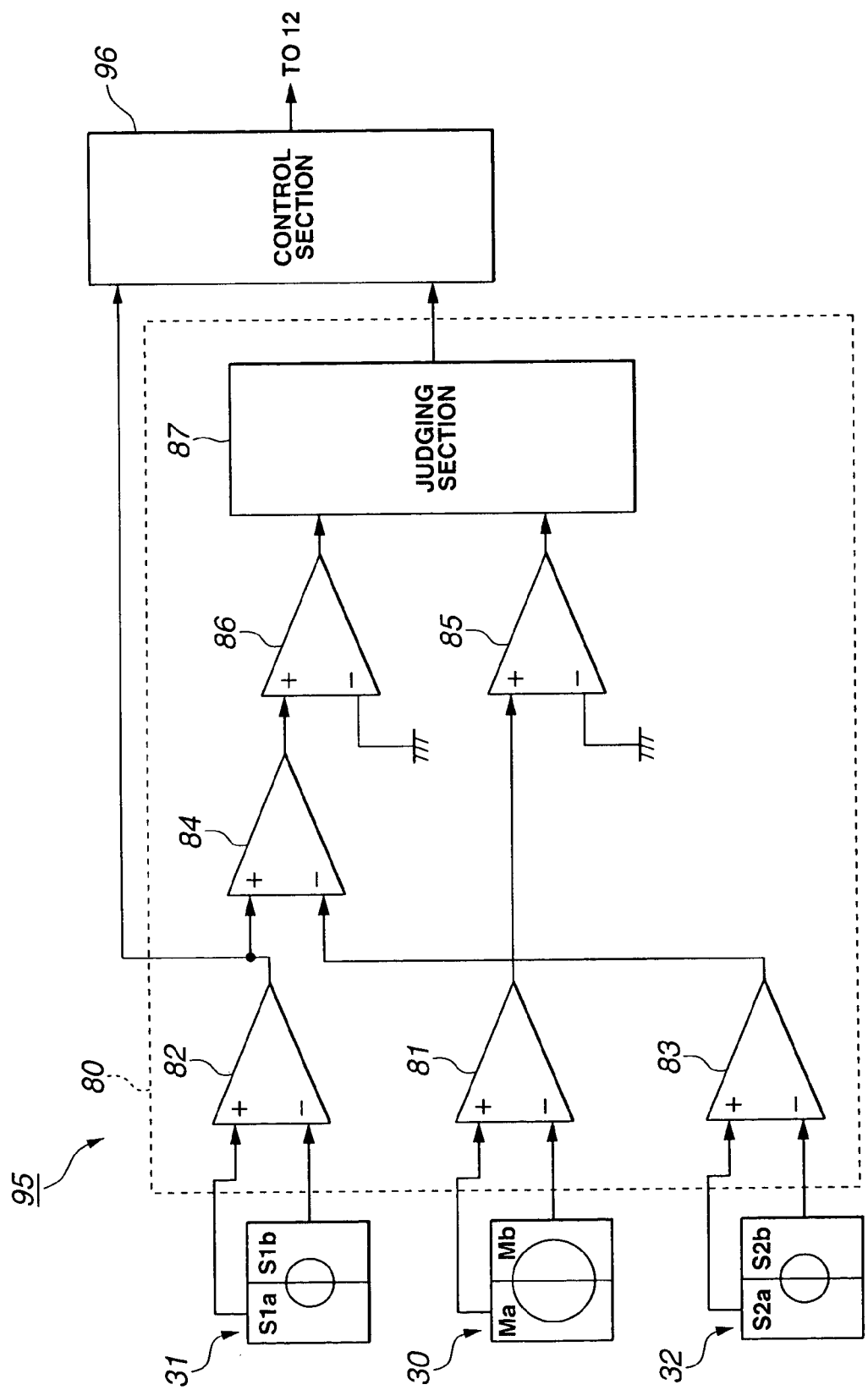
FIG. 15 is a schematic circuit diagram of the second version of the second embodiment of the invention, which is an optical bead control device.

Now, the second version of the second embodiment of the invention, which is an optical head control device 95, will be described below by referring to FIG. 15. The optical head control device 95 controls the radial position of an optical head that is adapted to irradiate three light spots as shown in FIG. 5 on a magneto-optical disc 1 as shown in FIGS. 3 and 4 and detect the quantity of light reflected by the magneto-optical disc 1 by means of three photodetectors as shown in FIG. 6.

The optical head control device 95 determines the moving direction of the light spots by means of the light spot moving direction judging device 80 it contains as shown in FIGS. 12 and 13 and controls the radial position of the optical head on the magneto-optical disc 1 by means of the control section 95 on the basis of the moving direction of the light spots as determined by the light spot moving direction judging device 80.

More specifically, the optical bead control device 95 determines the moving direction of the light spots by means of the light spot moving direction judging device 80 and drives the sliding motor by means of its control section 96 on the basis of the judgment on the moving direction of the light spot so as to move the optical head to a position close to the track wanted by the user. Then, the control section 96 of the optical head control device 95 causes the optical head to read the address of the track so as to move the light spots exactly on the wanted track and subsequently performs a tracking control operation.

Now, the tracking control operation of the control section 96 will be described below.

The control section 96 is fed with the difference signal S1a–S1b of the side spot S1 coming from the differential amplifier 82 of the light spot moving direction judging device 80. Then, the control section 96 performs a tracking control operation, using the difference signal S1a–S1b of the side spot S1 computed by the differential amplifier 82 as tracking error signal TE.

Thus, the optical head control device 95 controls the tracking operation of the optical head relative to the magneto-optical disc 1 on the basis of the difference signal S1a–S1b of the two signals obtained by detecting the quantity of reflected light coming from at least one of the two side spots S1, S2, or the side spot S1, by means of the divided two light detecting regions S1a, S1b.

The principle of the tracking control operation of the optical head control device 95, using a side spot, is same the one described earlier.

Figure 16:
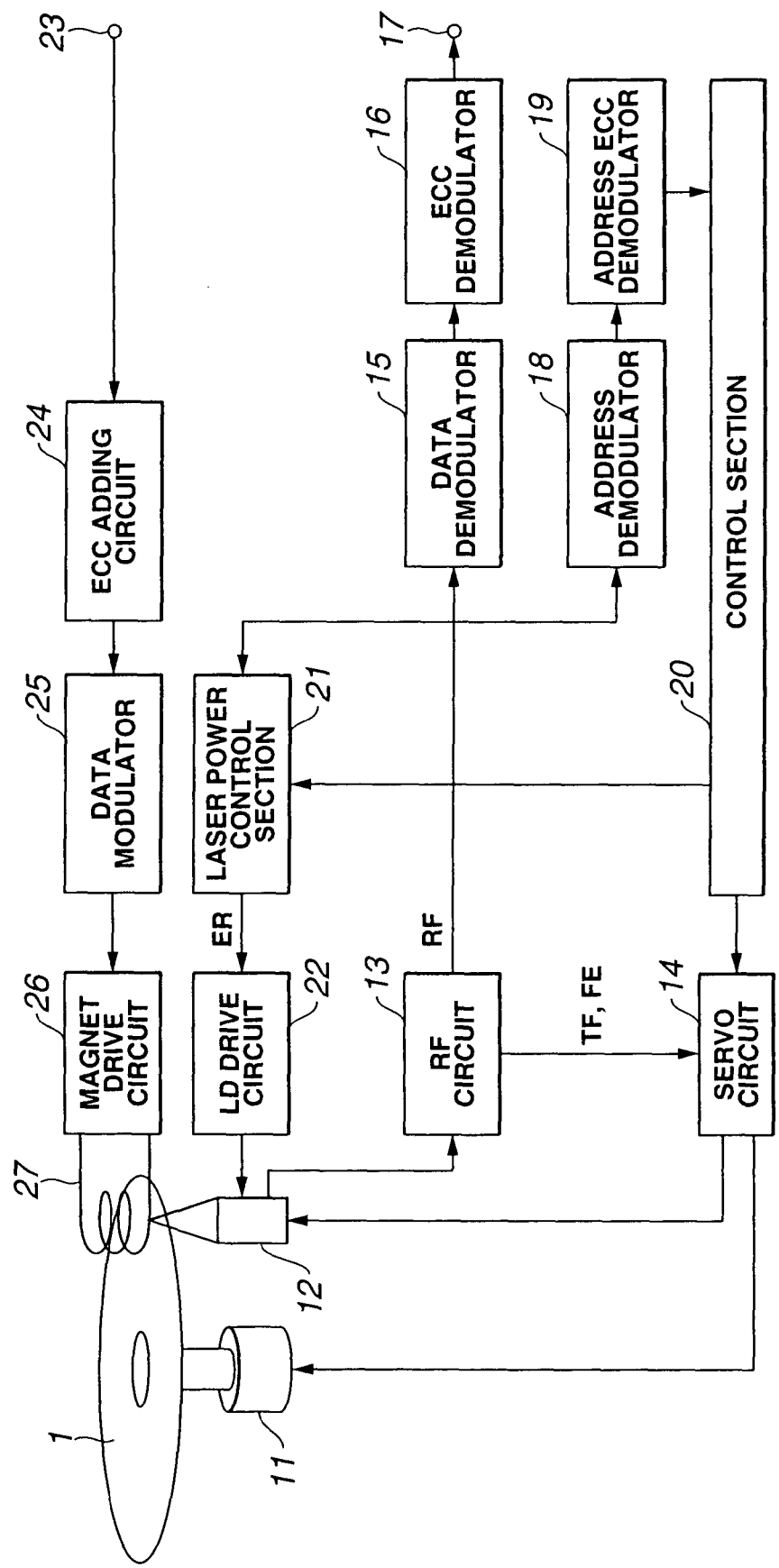
FIG. 16 is a schematic block diagram of the third embodiment of the invention, which is a magneto-optical disc recording/replay apparatus.

Now, the third embodiment of the invention, which is a magneto-optical disc recording/replay apparatus comprising the second embodiment of the invention, which is an optical head control device 90 or 95, and adapted to record signals on and reproduce signals from a magneto-optical disc 1 will be described below. As shown in FIG. 16, the magneto-optical disc recording/replay apparatus comprises a spindle motor 11, an optical head 12, an RF circuit 13, a servo circuit 14, a data demodulator 15, a data ECC (error correcting code) demodulator 16, an output terminal 17, an address demodulator 18, an address ECC demodulator 19, a control section 20, a laser power control circuit 21, an LD drive circuit 22, an input terminal 23, an ECC adding section 24, a data demodulator 25, a magnet drive circuit 26 and an external magnetic field generating coil 27.

The optical head 12 is of the type adapted to irradiate three light beams including a main beam and two side beams onto a magneto-optical disc 1 and comprises a light beam source such as a laser diode, a collimator lens, an objective lens, a polarization beams splitter, a cylindrical lens and other optical elements. The optical head 12 further comprises a first photodetector 30, a second photodetector 31, a third photodetector 32, a sliding motor and so on. The NA of the optical system of the optical head 12 is 0.52 and the light beam emitted from the light beam source has a wavelength λ of 0.66 μm.

The RF circuit 13 comprises a reproduction signal generating section, a plurality of differential amplifiers contained in the light spot moving direction judging device 33 or 80 and a focussing error signal generating section. Particularly, the differential amplifier 35 or 82 is adapted to generate a tracking error signal TE.

The reproduction signal generating section produces a reproduction signal RF by using the detection signals Ma and Mb from the first photodetector 31. The reproduction signal RF is then supplied to the data demodulator 15, the address demodulator 18 and the laser power control circuit 21.

The focussing error signal generating section generates a focussing error signal FE by using the detection signals Ma, Mb from the first photodetector 31, the detection signals S1a, S1b from the second photodetector 32 and the detection signals S2a, S2b from the third photodetector 33. The focussing error signal FE is supplied to the servo circuit 14.

The servo circuit 14 generates a tracking servo signal and a focussing servo signal on the basis of the tracking error signal TE and the focussing error signal FE supplied from the RF circuit 13 and supplies them to the optical head 12. Particularly, the servo circuit 14 contains a control section 91 or 96 and generates a tracking servo signal on the basis of the tracking error signal TE, which tracking servo signal is used to control the tracking operation of the optical head 12.

Before the servo circuit 14 performs a tracking operation, the control section 20 determines the moving direction of the light spots. In other words, the control section 20 comprises a plurality of comparators and a judging section 38 or 87, which constitute the light spot moving direction judging device 33 or 80, whichever appropriate.

With the above arrangement, the servo circuit 14 performs a tracking servo operation and a focussing servo operation for the light beams emitted from the optical head 12 so that the light spots are made to accurately scan recording tracks T on the magneto-optical disc 1.

In the magneto-optical disc recording/replay apparatus, the address demodulator 18 extracts address data from the reproduction signal RF supplied to it in order to reproduce data from the position on the magneto-optical disc 1 that exactly corresponds to the instruction of the user. Address data are recorded in the micro pits on each pair of grooves of the magneto-optical disc 1 and can be extracted according to the change in the reproduction signal RF.

The address demodulator 18 demodulates the extracted address data and supplies the demodulated address data to the address ECC demodulator 19. The address ECC demodulator 19 performs an error detecting operation and an error correcting operation on the demodulated address data and supplies the restored address data to the control section 20.

The control section 20 acquires the position on the magneto-optical disc 1 where the light beams are scanning from the address data supplied to it and supplies a control signal including information instructing the movement of the scanning position of the light beams to the servo circuit 14 that is generated by it on the basis of the reproduction address data so that the light beams may exactly scan the target track on the magneto-optical disc 1.

As pointed out earlier, the control section 20 comprises a plurality of comparators that constitute the light spot moving direction judging device 33 or 80 and a judging section 38 or 87, whichever appropriate. Thus, it reduces the differential output of the RF circuit 13 into a binarized data and causes the judging section 38 or 87 to take in the binarized data and judge the radial moving direction of the main spot M on the disc in a manner as described earlier. The judgment on the moving direction of the main spot M obtained by the control section 20 is supplied to the servo circuit 14.

The servo circuit 14 generates a control signal for controlling the light beams emitted from the optical head 12 so as to change their scanning position on the basis of the control signal from the control section 20 and supplies the generated control signal to the optical head 12. As a result, data can be read out from the position on the magneto-optical disc 100 that is selected according to the instruction given by the user. At this time, the servo circuit 12 generates a control signal on the basis of the judgment on the moving direction of the main spot M it receives from the control section 20.

As may be understood from the above description, the light spot moving direction judging device 33 or 80 that is shared by the RF circuit 13 and the control section 20 makes a judgment on the moving direction of the light spots and the control section 91 or 96 arranged in the servo circuit 14 drives the optical head 12 to a position near the wanted track by controlling the sliding motor on the basis of the judgment. Then, the control section 91 or 96, whichever appropriate, causes the optical head to read the address of the track so as to move the light spots exactly on the wanted track and subsequently performs a tracking control operation.

The laser power control circuit 21 generates a power error signal ER signal for controlling the power of the light beams emitted from the optical bead 12 according to the reproduction signal RF supplied to it and feeds the power error signal ER to the LD drive circuit 22.

The LD drive circuit 22 generates a control signal for controlling the power of the light beams irradiated onto the magneto-optical disc 1 from the optical head 12 according to the power error signal ER and supplies it to the optical head 12 in order to constantly maintain the power of the light beams to a right level.

As the signal that is recorded on the magneto-optical disc 1 and wanted by the user is supplied to the data demodulator 15 as reproduction signal RF in a manner as described above, the data demodulator 15 shapes the waveform of the reproduction signal RF supplied to it and converts it into data of "0s" and "1s". Then, the data demodulator 15 supplies the data to the ECC demodulator 16. The ECC demodulator 16 performs an error detecting operation and an error correcting operation on the data to restore the original data and outputs the restored data by way of the output terminal 17.

Thus, with the above described magneto-optical disc recording/replay apparatus according to the invention, the control section 91 or 96 that is a principal component of the optical head control device and contained in the servo circuit 14 controls the operation of the sled motor and performs a tracking control operation according to the moving direction of the main spot M as determined by the light spot moving direction judging device 33 or 80 that is shared by the RF circuit 13 and the control section 20. Therefore, with the above arrangement, it is possible to accurately reproduce data from the target position on a selected recording track T of a magneto-optical disc 1.

Now, the arrangement for recording a signal on a magneto-optical disc 1 according to the invention will be described below. The data that is input by way of the input terminal 23 is supplied to the ECC adding circuit 24, where an error correction code is added to the data. Subsequently, the data is supplied to the data modulator 25. The data modulator 25 modulates the data, to which the error correction code is added, with an appropriate modulation method such as the EFM modulation method and supplies the modulated data to the magnet drive circuit 26.

The magnet drive circuit 26 drives the external magnetic field generating coil 27 according to the data to be recorded. As shown in FIG. 16, the external magnetic field generating coil 27 is arranged vis-a-vis the optical head 12 on a line extended from the optical head 12 and adapted to move in a radial direction of the magneto-optical disc 1 in synchronism with the movement of the optical head 12. The external magnetic field generating coil 27 generates a + (positive) or − (negative) recording magnetic field according to the data to be recorded supplied from the magnet drive circuit 26.

At this time, the control section 20 controls the related various components of the apparatus by referring to the address data read out from the magneto-optical disc 1 in a manner as described above and regulates the position on the magneto-optical disc 1 to be irradiated with light beams from the optical head 12 and also the position on the magneto-optical disc 1 to which a magnetic field is applied from the external magnetic field generating coil 27. Additionally, the laser power control circuit 21 controls the power of the light beams from the optical head 12 under the control of the control section 20 so that the power of the light beams may be held to a level suitable for the recording operation.

The magneto-optical disc 1 is driven to rotate at a predetermined number of revolutions per unit time. Then, a recording mark is formed on the recording track from the target position on the magneto-optical disc 1 according to the polarity of the external magnetic field generating coil 27. Thus, the data to be recorded is actually recorded on the recording track T of the magneto-optical disc 1.

During the data recording operation, again, the control section 91 or 96 that is a principal component of the optical head control device and contained in the servo circuit 14 controls the operation of the sled motor and performs a tracking control operation according to the moving direction of the main spot M as determined by the light spot moving direction judging device 33 or 80 that is shared by the RF circuit 13 and the control section 20. Therefore, with the above arrangement, it is possible to accurately record data from the target position on a selected recording track T of a magneto-optical disc 1.

Figure 17:
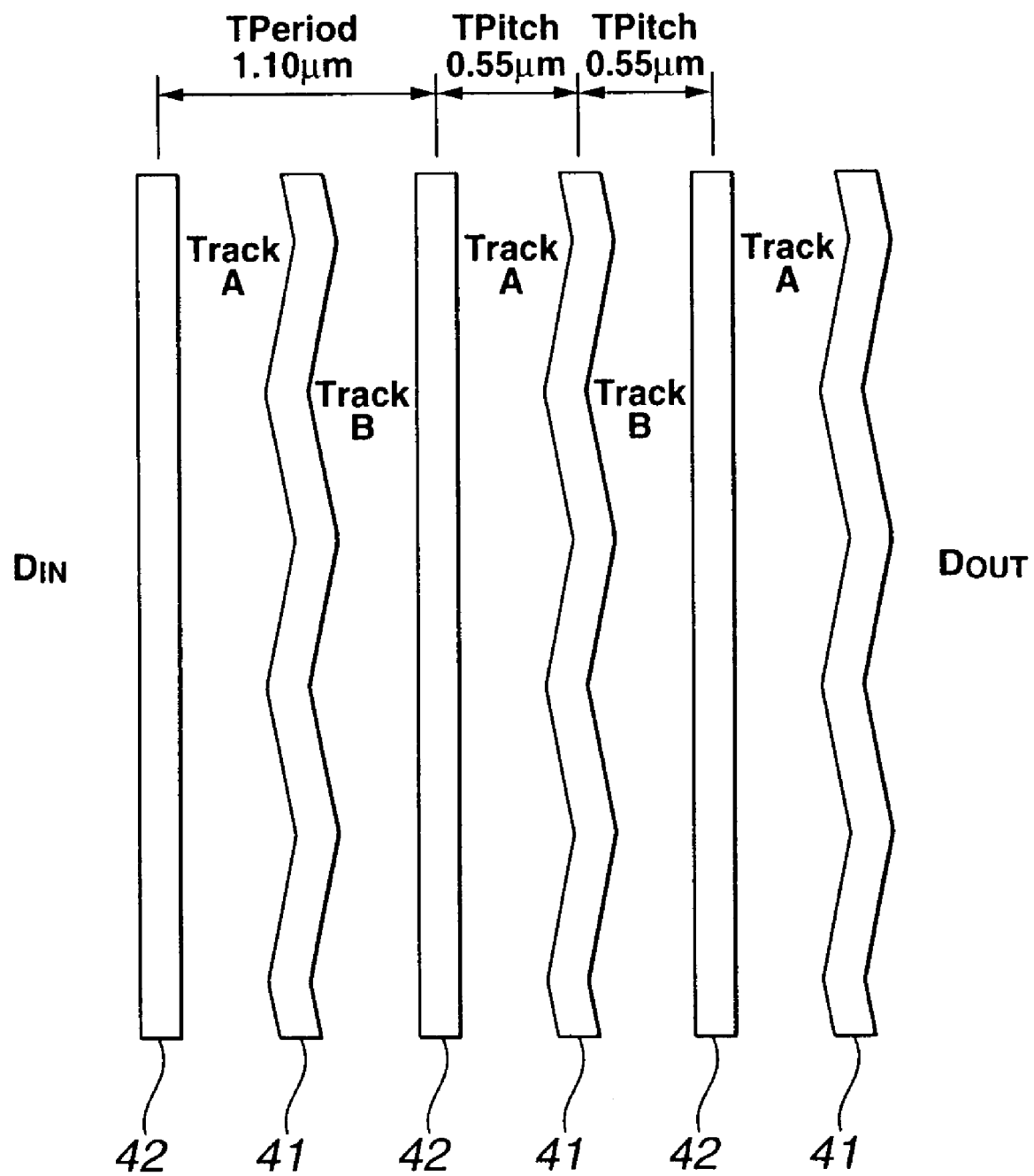
FIG. 17 is a schematic illustration of a magneto-optical disc of the type where one of each pair of grooves is wobbled.

Now, the fourth embodiment of the invention, which is a magneto-optical disc recording/replay apparatus comprising the second embodiment of the invention, which is an optical head control device 90 or 95, and adapted to record signals on and reproduce signals from a magneto-optical disc as shown in FIG. 17 will be described below.

Firstly, the magneto-optical disc 40 shown in FIG. 17 will be described. This magneto-optical disc 40 is a magneto-optical disc of the type on which marks are recorded by a magneto-optical effect and recording mark is detected by domain wall displacement detection (DWDD).

As shown in FIG. 17, the magneto-optical disc 40 has first recording tracks A and second recording tracks B, first grooves 41 formed helically with depth d1 along the first recording tracks A and the second recording tracks B and second grooves 42 formed helically with depth d2 (d1<d2) along the first recording tracks A and the second recording tracks B so as to produce double helices with the first grooves 41.

The first grooves 41 are wobbling grooves that cyclically meanders with a predetermined cycle and an amplitude of ±10 nm (to be referred to as wobbling grooves 41 hereinafter). The second grooves 42 are straight grooves (to be referred to as straight grooves 42 hereinafter). The grooves of the magneto-optical disc 40 is provided with address information as the grooves one of the two groups (the wobbling grooves 41) are made to meander.

Each of the first recording tracks A is a land sandwiched by a wobbling groove 41 and a straight groove 42, of which the straight groove 42 is arranged at the inner peripheral side DIN of the disc relative to the track and used for recording information signals. Each of the second recording tracks B is also a land sandwiched by a wobbling groove 41 and a straight groove 42, of which the wobbling groove 41 is arranged at the inner peripheral side DIN of the disc relative to the track and used for recording information signals.

The tracks are arranged at a track pitch TPitch of 0.55 μm on the magneto-optical disc 40. The track pitch TPitch corresponds to the distance between the center line of a wobbling groove 41 and that of the adjacently located straight groove 42. In other words, the center line of each wobbling groove 41 and that of a straight groove 42 located adjacent to the wobbling groove 41 is separated by a distance of 0.55 μm. The distance between the center line of a straight groove 42 and that of an adjacently located straight groove 42 is referred to as track period TPeriod.

The magneto-optical disc 40 also comprises a transparent substrate 2, a first dielectric film 3, a recording film 4, a second dielectric film 5 and a protection film 6 that are laid one on the other in the above mentioned order from the side of the disc for receiving the laser beam O to form a multilayer structure as shown in FIG. 4. Note that the first grooves G1 shown in FIG. 4 correspond to the wobbling grooves 41 and the second grooves G2 shown in FIG. 4 correspond to the straight grooves 42. In other words, the straight grooves 42 are made to have a depth d2 greater than the depth d1 of the wobbling grooves 41 (d2>d1). The recording film 4 is formed by laying a recording layer where marks smaller than the light spots for reproducing data are to be recorded and an expansion layer where small marks are read by means of domain expansion that is caused by the thermal distribution induced by the light spots of the optical pickup at the time of reproduction with a switching layer sandwiched between them to produce a multilayer structure.

As pointed out above, the magneto-optical disc 40 is an optical disc of the type where recorded marks are detected by domain wall displacement detection (DWDD) and for which the shallow and deep method is adopted. DWDD is a technique of reading recorded marks that are smaller than the light spots to be used for data reproduction by means of domain expansion that is caused by the thermal distribution induced by the light spots. Since the edges of marks can be clearly detected by domain wall displacement detection, DWDD is suited for reproducing data from a magneto-optical disc for which the technique of "mark edge recording" is used. When DWDD and the shallow and deep method are combined, the grooves of the magneto-optical disc are required to have a depth typically greater than 100 nm. Therefore, the first grooves and the second grooves of the magneto-optical disc 40 are made to have respective depths of 100 nm and 170 nm.

The magneto-optical disc 40 shows a track pitch of 0.55 μm and is adapted to be used with the land recording method and the RLL (1, 7) modulation method. It is called the third generation magneto-optical disc (the third format magneto-optical disc). Table 1 below shows the specifications of the third format magneto-optical disc and those of the magneto-optical discs of the preceding generations. The first format magneto-optical disc shows a track pitch of 1.6 μm and is adapted to be used with the groove recording method and the EFM modulation method. The second format magneto-optical disc shows a track pitch of 0.95 μm and is adapted to be used with the land recording method and the RLL (1,7) modulation method.

TABLE 1

|  | 2nd format | 1st format | 3rd format |
| --- | --- | --- | --- |
| track pitch | 0.95 μm | 1.6 μm | 0.55 μm or less |
| bit length | 0.34 μm/bit | 1.59 μm/bit | 0.13 μm/bit |
| λ · NA | 650 nm · 0.52 | 780 nm · 0.45 | 650 nm · 0.52 |
| recording method | LAND recording | GROOVE recording | LAND recording |
| addressing method | interlace addressing (double spiral with one side wobbling) | single spiral with both side wobbling | interlace addressing (double spiral with one side wobbling) |
| modulation method | RLL (1, 7) | EFM | RLL (1, 7) |

TABLE 1-continued

| | 2nd format | 1st format | 3rd format |
|---|---|---|---|
| error correction method | RS-PC | ACIRC | RS-LDC |
| interleave | block conclusion | convolution | block conclusion |
| minimum recording unit | 32 KB | 64 KB | 64 KB |
| redundancy | 20.43% | 46.3% | 19.02% |
| linear velocity | 2.0 m/s | 1.2 m/s | 1.53 m/s |
| data rate | 589 kB/s | 133 kB/s | 1.18 MB/s |
| recording capacity | 650 MB | 140 MB | 3.0 GB |

As pointed out earlier, the third format magneto-optical disc has a reduced track pitch that is as small as 0.55 μm. While the tracking error signal (push-pull signal) becomes too small with the ordinary groove recording method or the ordinary land recording method because the tracking pitch is too small relative to the laser beam spot, it is possible to obtain a satisfactorily large tracking error signal with the third format magneto-optical disc because the shallow and deep method is adopted for it. One side wobbling is used for the address input method with the third format magneto-optical disc as in the case of the second format magneto-optical disc. Absolute addresses are encoded by way of FM modulation and biphase modulation. While the address format of the third format magneto-optical disc is same as that of the second format magneto-optical disc, the third format magneto-optical disc differs from the second format magneto-optical disc in that, while the grooves of the two types have a same depth on the second format magneto-optical disc, they have different depths on the third format magneto-optical disc because the shallow and deep method is adopted for the latter.

The third format magneto-optical disc is characterized most in that data are reproduced by domain wall displacement detection (DWDD). Due to the use of domain wall displacement detection, the optical system to be used with the third format magneto-optical disc employs a laser wavelength of 650 nm and a lens numerical aperture of 0.52, which are same as those of the optical system to be used with the second format magneto-optical disc for the purpose of establishing downward compatibility, although the line density of the third format magneto-optical disc is as high as 2.6 times of that of the second format magneto-optical disc.

While RLL (1, 7) is used for the third format magneto-optical disc as method of modulating signals to be recorded, which is same as the modulation method of the second format magneto-optical disc, an LDC (long distance code) provided with a BIS (burst indicator subcode) and having a higher error correcting ability is used as error correction code for the third format magneto-optical disc. The minimum recording unit is 64 kB for the third format magneto-optical disc. With these specifications, the third format magneto-optical disc is made to have a remarkable recording capacity of 3 GB, which is about 4.6 times greater than the recording capacity of 650 MB of the second format magneto-optical disc.

Figure 18:
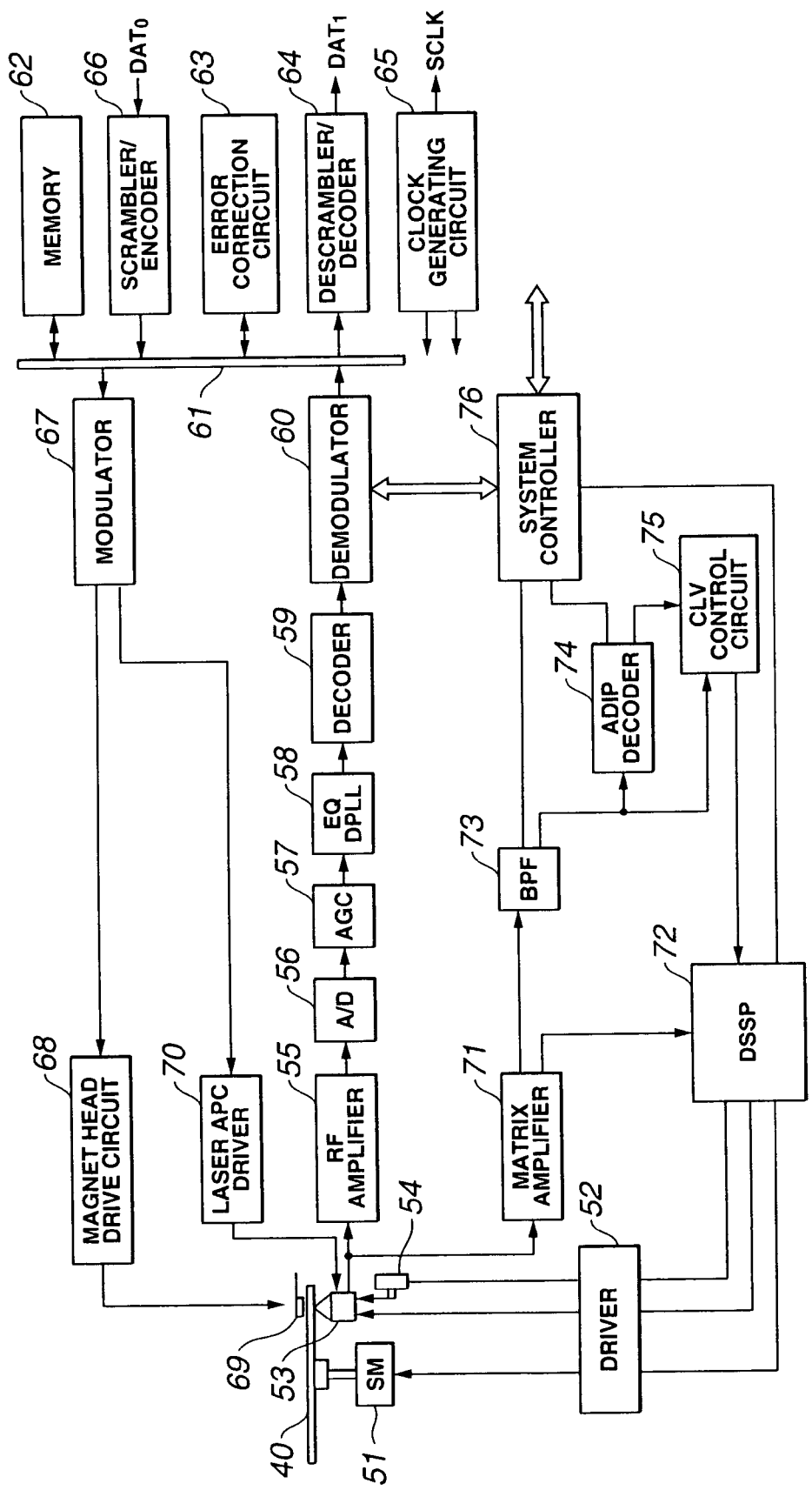
FIG. 18 is a schematic block diagram of a magneto-optical disc recording/replay apparatus adapted to record data on and reproduce data from a magneto-optical disc having a configuration as shown in FIG. 3.

FIG. 18 shows a magneto-optical disc recording/replay apparatus (the fourth embodiment of the invention) adapted to record data on and reproduce data from such a magneto-optical disc 40. It may be needless to say that the magneto-optical disc recording/replay apparatus also contains an optical head control device 90 or 95.

Firstly, the arrangement with which the magneto-optical disc recording/replay apparatus 50 drives the magneto-optical disc 40 and the arrangement with which the former drives the optical head 53 to move relative to the magneto-optical disc 40 will be described. The magneto-optical disc 40 is driven to rotate with a predetermined number of revolutions per unit time by a spindle motor 51. The spindle motor 51 is driven by a driver 52. The driver 52 drives the spindle motor 51 to rotate under the control of a digital servo processor (DSSP) 72, which will be described hereinafter.

The optical head 53 irradiates light beams onto the magneto-optical disc 40 that is being driven to rotate by the spindle motor 51. Data are read from the magneto-optical disc 40 by moving the optical bead 53 in a radial direction of the magneto-optical disc 40. The optical head 53 is supported by a sled mechanism provided with a sled motor 54 so that it can move in a radial direction of the magneto-optical disc 40. The optical bead 53 is driven to move by the sled mechanism when it has to move by a large distance to a new reading position. The objective lens of the optical head 53, which will be described hereinafter, is supported by a biaxial drive circuit in such a way that the optical head 53 is driven to move in a radial direction of the magneto-optical disc 40 by a tracking servo operation of the driver 52 when it has to move by a short distance. Furthermore, the light beams are controlled for focussing on the signal recording surface of the magneto-optical disc 40 as the objective lens is driven to move toward or away from the magneto-optical disc 40 by a focussing servo operation.

Now, the configuration of the replay section of the apparatus will be described below. The optical head 53 generates an RF signal and supplies it to the RF amplifier 55, where the RF signal is amplified with a predetermined gain. Then, the RF signal is sequentially supplied to a A/D converter 56, an automatic gain control (AGC) circuit 57, an equalizer (EQ) and digital PLL section 58, a decoder 59 and a demodulator 60, of which a signal processing section is comprised. The demodulator 60 is connected to a memory 62, an ECC encoder/decoder 63 and a descrambler/decoder 64 by way of an internal bus 61.

The replay section operates in a manner as described below. The signal picked up from the magneto-optical disc 40 by the optical head 53 is subjected to photoelectric conversion in the optical head 53 and then output as RF signal. The RF signal is then input to the RF amplifier 55 and amplified with a predetermined gain before it is supplied the A/D converter 56 of the signal processing section. The RF signal supplied to the A/D converter 56 is quantized there. Thereafter, the quantized RF signal is subjected to a gain control operation in the AGC processing section 57 and then to a wave shaping operation and an operation of generating a sampling clock in the equalizer (EQ) and digital PLL section 58. Subsequently, the RLL (1, 7) signal is decoded by the decoder 59 and demodulated by the demodulator 60. While the operations of AGC, equalization and DPLL are conducted by using the RF signal before the A/D conversion in the above described arrangement, they may alternatively be conducted before the A/D conversion of the RF signal. The data stream produced from the demodulator 60 as a result of demodulation is developed on the memory 62 and subjected to error correction by the ECC encoder/decoder 63 on the basis of a unit of error correction block. The data that are corrected for errors is then descrambled and decoded by the descrambler/decoder 64 and output as $DAT_1$ signal from a clock generator 65 with transfer clock SCLK from a clock generator 65.

Now, the configuration of the recording section of the apparatus will be described. The $DAT_0$ signal input there is processed by a scrambler/encoder 66 and then sequentially supplied to the memory 62, the ECC encoder/decoder 63 and a modulator 67 by way of the internal bus 61. The modulator 67 supplies the modulated data to a magnet head drive section 68. The magnet head drive section 68 drives the magnet head 69. The modulator 67 also supplies a clock signal to a laser APC circuit and driver 70.

The recording section operates in a manner as described below. The $DAT_0$ signal input in synchronism with the transfer clock SCLK is scrambled and encoded by the scrambler/encoder 66 and then written into the memory 62. The data written into the memory 62 is provided with error correction parity by the ECC encoder/decoder 63 and supplied to the modulator 67 by way of the internal bus 61. The data modulated by the modulator 67 is then supplied to the magnet head 69 by way of the magnet head drive section 68. On the other hand, a laser strobe modulation clock is given to the laser APC circuit and driver 70 from the modulator 67.

Now, the configuration of the servo system will be described. The servo system comprises a matrix amplifier 71 for extracting servo error signals including a tracking error signal and a focussing error signal and a wobble signal from the signal generated by the optical head 53, a DSSP 72 for performing a predetermined servo processing operation on the sled mechanism and the actuator of the optical head 53 by way of the driver 52 on the basis of the servo error signal and a predetermined spindle servo processing operation according to the CLV control signal, which will be described hereinafter, on the spindle motor 51 and a system controller 76 for controlling the DSSP 72. The servo system further comprises a BPF 73 for detecting an ADIP (address in pre-troove) signal from the wobble signal extracted by the matrix amplifier 71, an ADIP decoder 74 for decoding the ADIP signal and a CLV control section 75 for supplying a CLV control signal to the DSSP 72.

Now, the operation of the servo system will be roughly described below. The servo signals including a tracking error signal and a focussing error signal that are extracted from the signal from the optical head 53 by the matrix amplifier 71 are subjected to a phase compensating operation, a gain/target value selecting operation and other operations in the DSSP 72 before they are supplied to the actuator and thread motor 54 in the optical head 53 by way of the driver 52.

On the other hand, some components of the wobble signal output from the matrix amplifier 71 are extracted by the bandpass filter (BPF) 73 and the address information decoded by the ADIP decoder 74 is transferred to the system controller 76. The output of the BPF 73, the integral of the PLL phase error in the ADIP decoder 74 and the control signal from the system controller 76 are supplied to the CLV control section 75 and then to the spindle motor 51 by way of the DSSP 72 and the driver 52.

The above described servo system contains an optical head control device 90 or 95. Firstly, the light spot moving direction judging device 33 or 80 that the optical head control device 90 or 95, whichever appropriate, comprises is found in the matrix amplifier 71 and the system controller 76 in a distributed manner. More specifically, the plurality of differential amplifiers of the light spot moving direction judging device 33 or 80 are contained in the matrix amplifier 71, whereas the plurality of comparators and the judging section 38 or 87, whichever appropriate, are contained in the system controller 76. The control section 91 or 96 that is a principal component of the optical head control device 90 or 95, whichever appropriate, is contained in the DSSP 72.

The first photodetector 30, the second photodetector 31 and the third photodetector 32 illustrated in FIG. 4 are contained in the inside of the optical head 53.

Thus, with this embodiment of magneto-optical disc recording/replay apparatus again, the control section 91 or 96 that is located in the inside of the DSSP 72 and constitutes a principal component of the optical head control device controls the sled motor and the tracking control operation according to the moving direction of the main spot M as determined by the light spot moving direction judging device 33 or 80, whichever appropriate, that is shared by the matrix amplifier 71 and the system controller 76 for the purpose of the data reproducing operation so that data can be reproduced from the right position on the recording track T.

Similarly, the control section 91 or 96 that is located in the inside of the DSSP 72 and constitutes a principal component of the optical head control device controls the sled motor and the tracking control operation according to the moving direction of the main spot M as determined by the light spot moving direction judging device 33 or 80, whichever appropriate, that is shared by the matrix amplifier 71 and the system controller 76 for the purpose of the data recording operation so that data can be recorded from the right position on the recording track T.

It should be noted here again that the first version and the second version of the first embodiment, which is a light spot moving direction judging device, are adapted to determine the moving direction of the light spots irradiated onto a magneto-optical disc 1 or 40, whichever appropriate, where the grooves G1 and the grooves G2 have respective depths that are different from each other while the lands L have a same height and the lands L are used as recording tracks as described earlier by referring to FIGS. 3 and 4 or FIGS. 17 and 4, whichever appropriate. However, the first and second versions may also be used to determine the moving direction of the light spot irradiated onto a magneto-optical disc of some other type. Now, some magneto-optical disc of the types different from the above described one will be discussed below.

Figure 19:
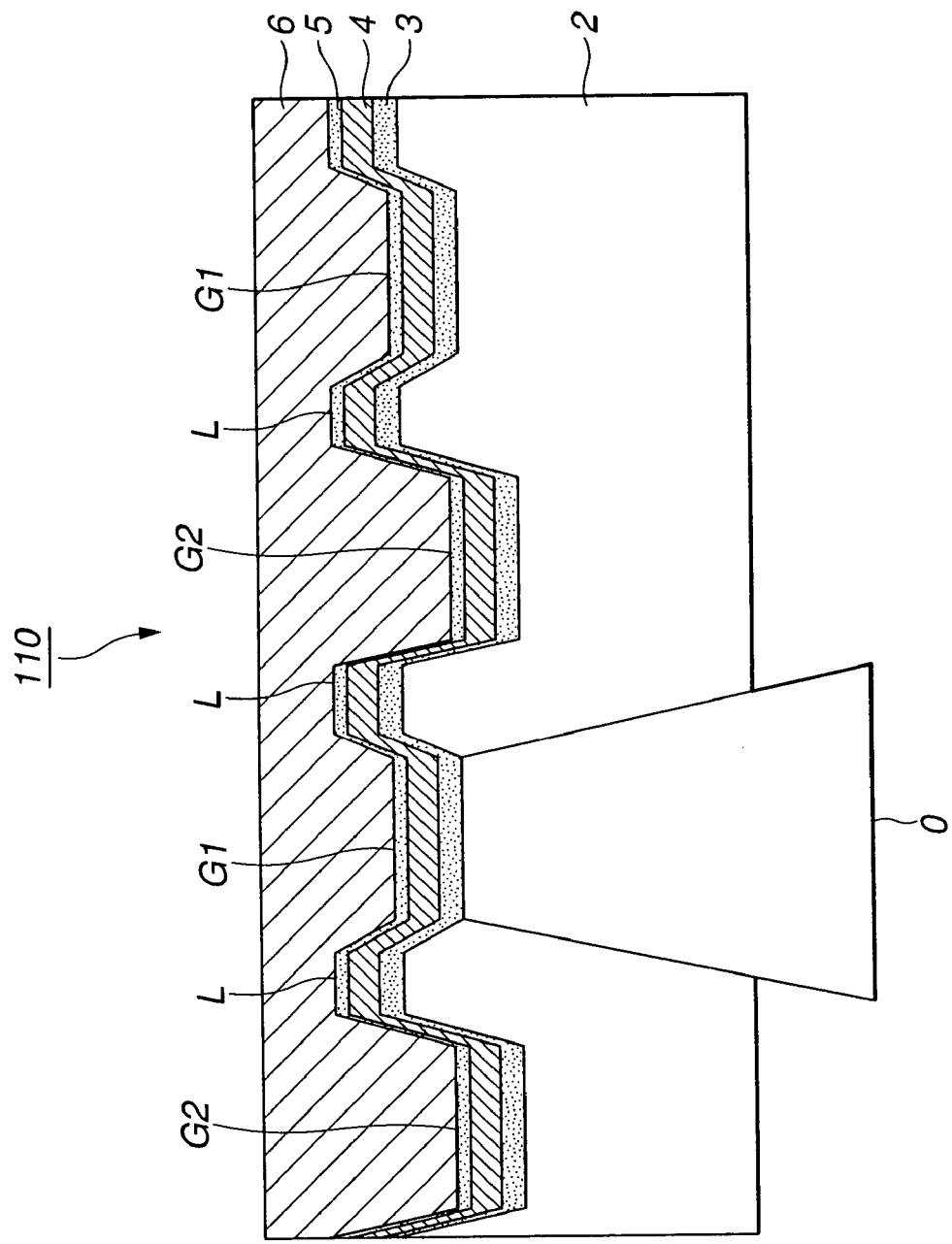
FIG. 19 is a schematic cross sectional view of the first other example of magneto-optical disc according to the invention.

FIG. 19 shows a schematic cross sectional view of the first other example of magneto-optical disc. As shown in FIG. 19, the magneto-optical disc 110 has grooves G1 and grooves G2 having respective depths that are different from each other and lands L having a same height. The grooves G1, G2 of the two different types have a width greater than that of the lands L and are used as recording tracks. The depth d1 of the grooves G1 of the first group is smaller than the depth d2 of the grooves G2 of the second group. Since the magneto-optical disc 110 has a film structure same as the one illustrated in FIG. 4, the components thereof are denoted respectively by the same reference symbols. It may be so arranged that the grooves of one of the two different groups are wobble grooves, while those of the other group are straight grooves.

Figure 20:
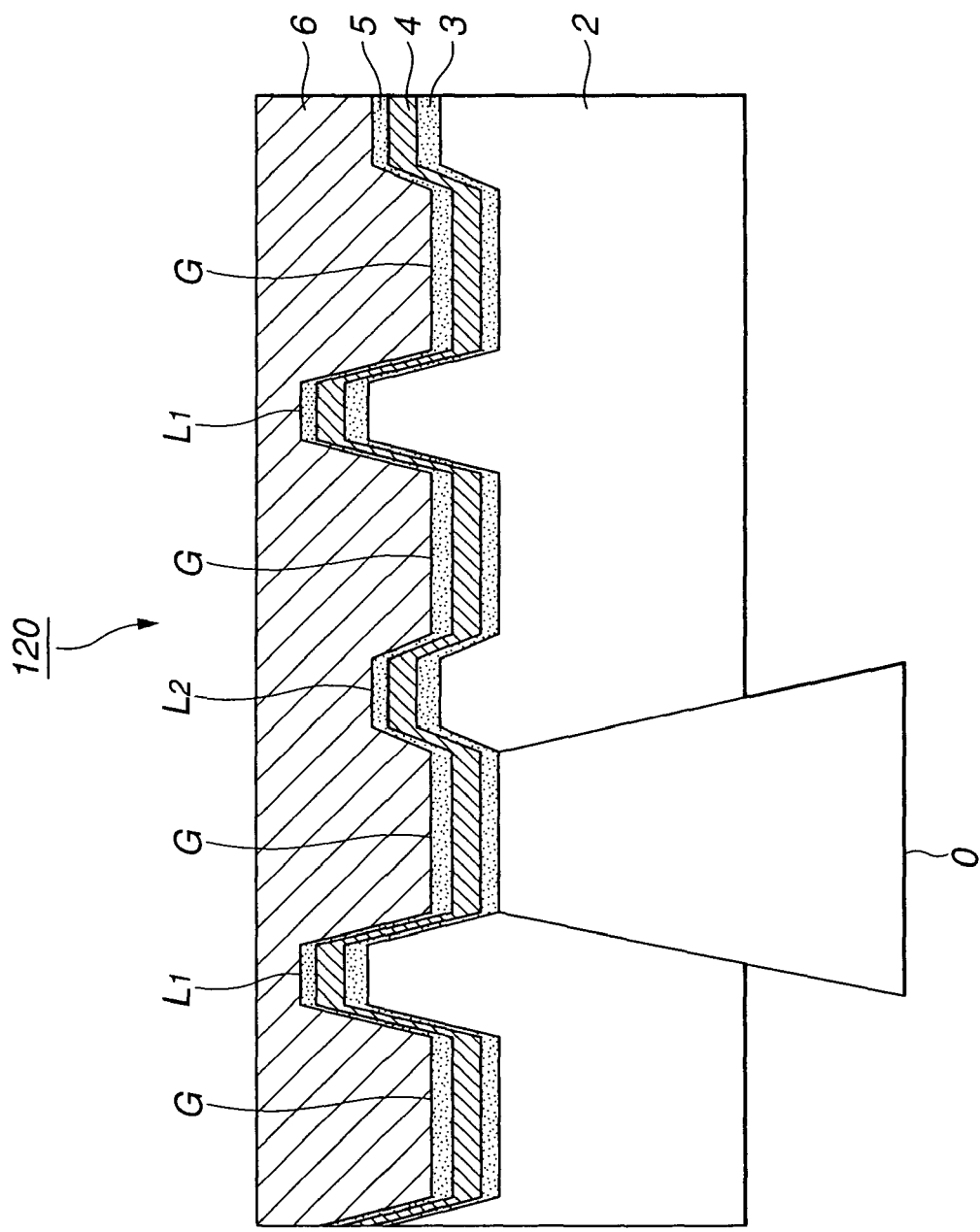
FIG. 20 is a schematic cross sectional view of the second other example of magneto-optical disc according to the invention.

FIG. 20 shows a schematic cross sectional view of the second other example of magneto-optical disc. As shown in FIG. 20, the magneto-optical disc 120 has grooves G having a same depth and lands L1 and lands L2 having respective heights that are different from each other. The grooves G have a width greater than that of the lands L1, L2 of the two different types and are used as recording tracks. The height h1 of the lands L1 of the first group is smaller than the height h2 of the lands L2 of the second group. The structure of the magneto-optical disc 120 is same as the one described earlier by referring to FIG. 4. It may be so arranged that some of the grooves are wobble grooves, while the remaining grooves are straight grooves.

Figure 21:
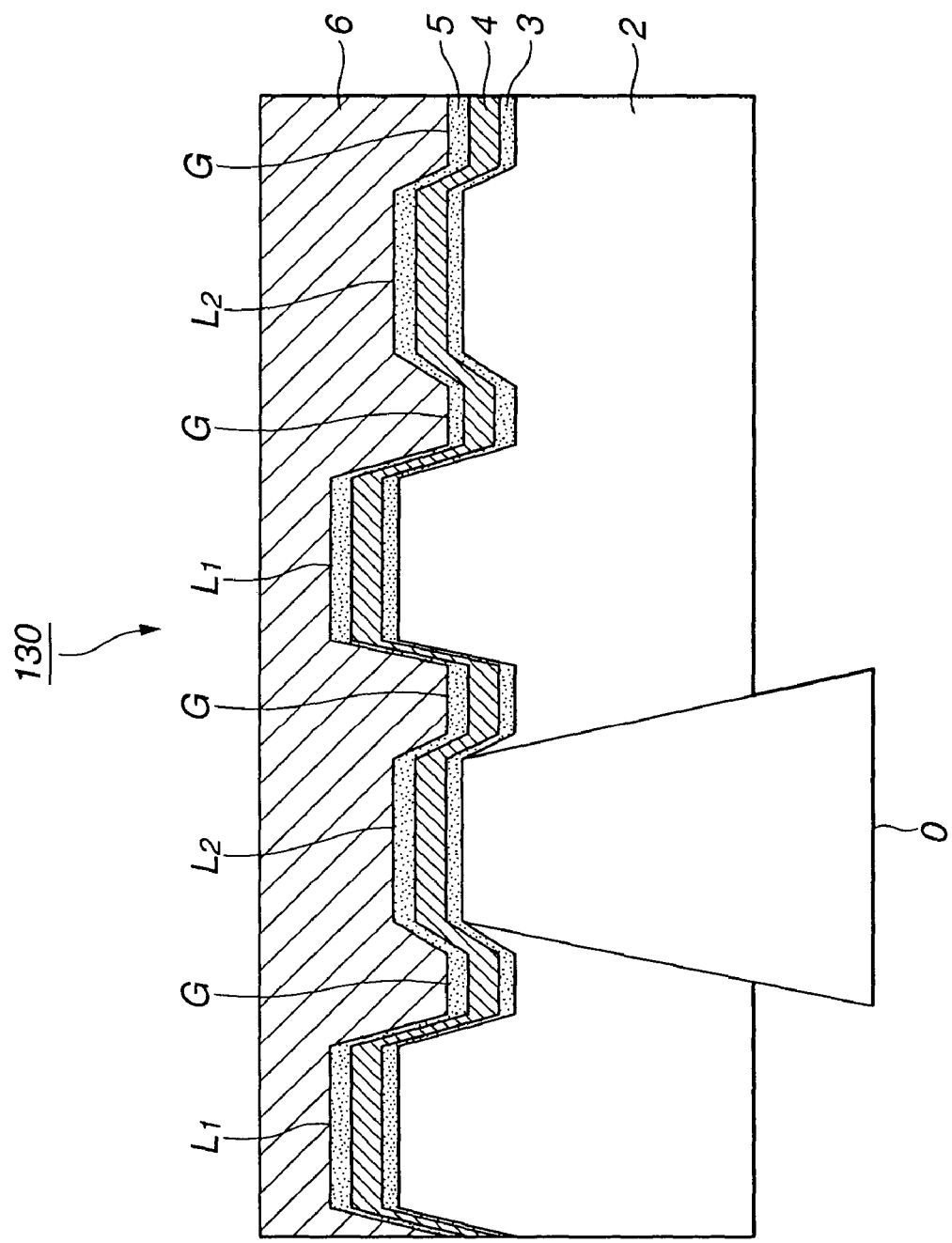
FIG. 21 is a schematic cross sectional view of the third other example of magneto-optical disc according to the invention.

FIG. 21 shows a schematic cross sectional view of the third other example of magneto-optical disc. As shown in FIG. 21, the magneto-optical disc 130 has grooves having a same depth and lands L1 and lands L2 having respective heights h1 and h2 that are different from each other. The lands L1, L2 of the two different types have a width greater than that of the grooves G and are used as recording tracks. The structure of the magneto-optical disc 130 is same as the one described earlier by referring to FIG. 4. Again, it may be so arranged that some of the grooves are wobble grooves, while the remaining grooves are straight grooves.

Figure 22:
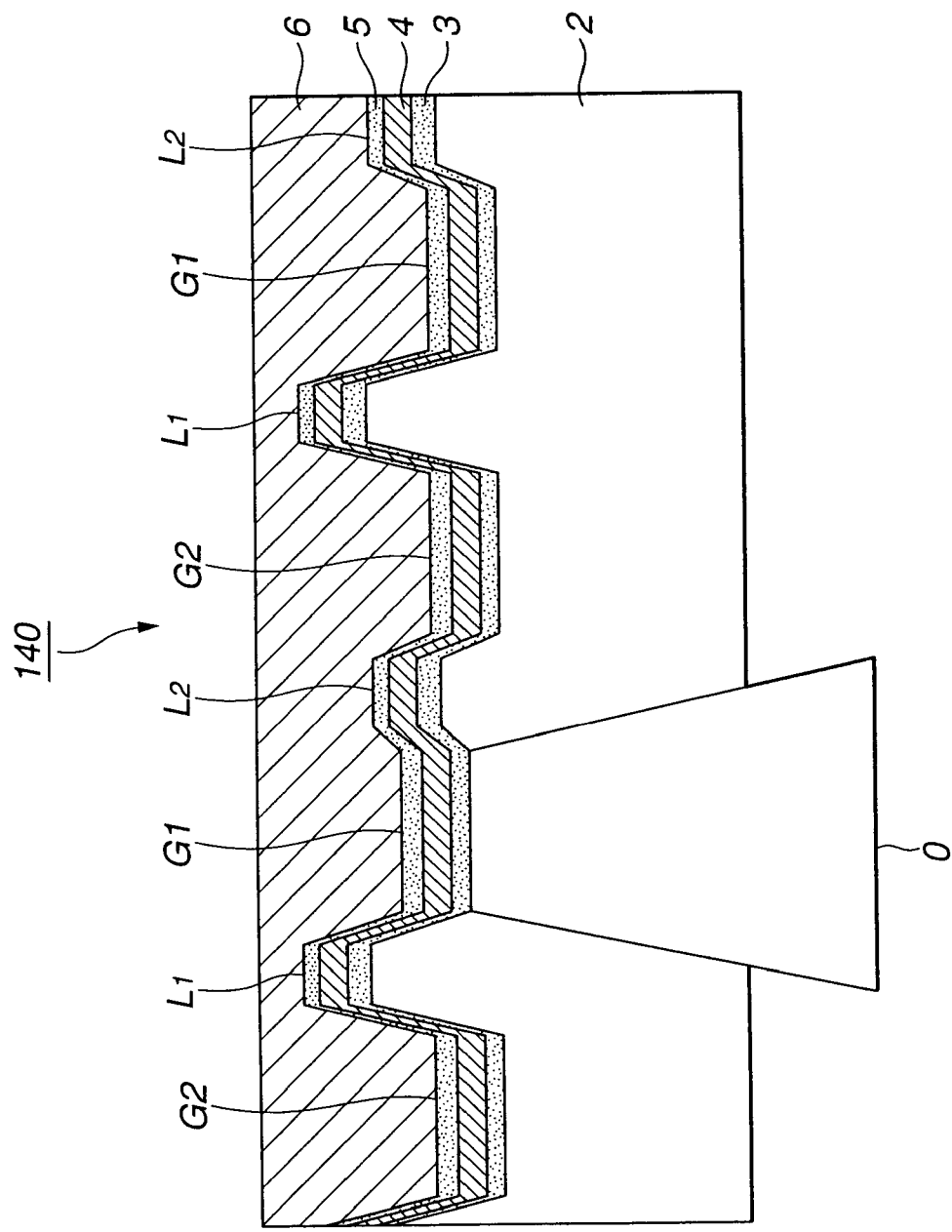
FIG. 22 is a schematic cross sectional view of the fourth other example of magneto-optical disc according to the invention.

FIG. 22 shows a schematic cross sectional view of the fourth other example of magneto-optical disc. As shown in FIG. 22, the magneto-optical disc 140 has grooves G1 and grooves G2 having respective depths that are different from each other and lands L1 and lands L2 having respective heights that are different from each other. The grooves G1, G2 have a width greater than that of the lands L1, L2 and are used as recording tracks. The magneto-optical disc 140 has a film structure same as the one described earlier by referring to FIG. 4. Again, it may be so arranged that the grooves of one of the two different groups are wobble grooves, while those of the other group are straight grooves.

Figure 23:
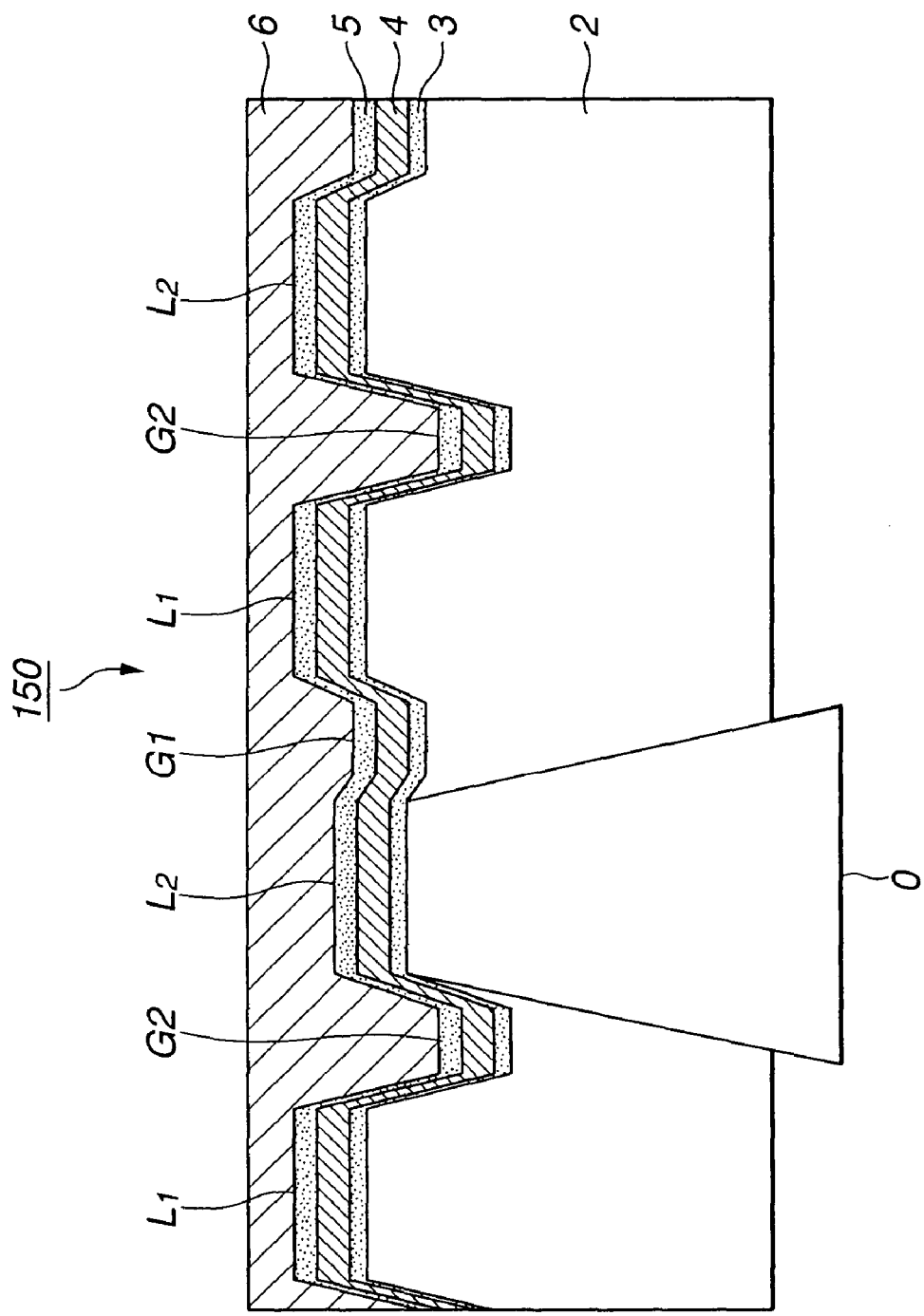
FIG. 23 is a schematic cross sectional view of the fifth other example of magneto-optical disc according to the invention.

FIG. 23 shows a schematic cross sectional view of the fifth other example of magneto-optical disc. As shown in FIG. 23, the magneto-optical disc 150 has grooves G1 and grooves G2 having respective depths that are different from each other and lands L1 and lands L2 having respective heights that are different from each other. The lands L1, L2 have a width greater than that of the grooves G1, G2 and are used as recording tracks. The magneto-optical disc 150 has a film structure same as the one described earlier by referring to FIG. 4. Again, it may be so arranged that the grooves of one of the two different groups are wobble grooves, while those of the other group are straight grooves.

The first and second versions of the second embodiment of the invention, which is an optical head control device, may be so adapted as to control the radial position of the optical head on a magneto-optical disc 110, 120, 130, 140 or 150.

The third embodiment of the invention, which is a magneto-optical disc recording/replay apparatus, may be so arranged that it may record magneto-optical signals on and reproduce magneto-optical signals from a magneto-optical disc 110, 120, 130, 140 or 150. Finally, the fourth embodiment of the invention, which is also a magneto-optical disc recording/replay apparatus, may be so arranged that it may record magneto-optical signals on and reproduce magneto-optical signals from a magneto-optical disc 110, 120, 130, 140 or 150, where some of the grooves are wobble grooves, while the remaining grooves are straight grooves.

INDUSTRIAL APPLICABILITY

In a light spot moving direction judging device according to the invention, the judging means judges the moving direction of the main spot on the basis of the binarized data of the difference signal of the main spot from the first binarizing means and the binarized data of the difference signal of the side spot from the second binarizing means. Therefore, the light spot moving direction judging device can judge the radial moving direction of light spots on an optical disc having grooves of two different types having different respective depths, each pair of grooves located adjacently and sandwiching a land, by using only difference signals without using any sum signal.

With a light spot moving direction judging device according to the invention, the moving direction of the main spot is judged in the judging step on the basis of the binarized data of the difference signal of the main spot from the first binarizing means and the binarized data of the difference signal of the side spot from the second binarizing means. Therefore, the light spot moving direction judging method can judge the radial moving direction of light spots on an optical disc having grooves of two different types having different respective depths, each pair of grooves located adjacently and sandwiching a land, by using only difference signals without using any sum signal.

In a light spot moving direction judging device according to the invention, the judging means judges the moving direction of the main spot on the basis of the binarized data of the difference signal of the main spot from the first binarizing means and the binarized data of the difference signal of the difference signals of the two side spots from the second binarizing means. Therefore, the light spot moving direction judging device can judge the radial moving direction of light spots on an optical disc having grooves of two different types having different respective depths, each pair of grooves located adjacently and sandwiching a land, by using only difference signals without using any sum signal.

With a light spot moving direction judging method according to the invention, the moving direction of the main spot is judged in the judging step on the basis of the binarized data of the difference signal of the main spot from the first binarizing step and the binarized data of the difference signal of the difference signals of the two side spots from the second binarizing step. Therefore, the light spot moving direction judging method can judge the radial moving direction of light spots on an optical disc having grooves of two different types having different respective depths, each pair of grooves located adjacently and sandwiching a land, by using only difference signals without using any sum signal.

In an optical head control device according to the invention, the judging means of the light spot moving direction judging device judges the moving direction of the main spot on the basis of the binarized data of the difference signal of the main spot from the first binarizing means and the binarized data of the difference signal of the side spot from the second binarizing means. Therefore, the control means can control the position of the optical head relative to the optical disc in the radial direction of the disc.

With an optical head control method according to the invention, the moving direction of the main spot is judged in the judging step of the light spot moving direction judging step on the basis of the binarized data of the difference signal of the main spot from the first binarizing means and the binarized data of the difference signal of the side spot from the second binarizing means. Therefore, the position of the optical head relative to the optical disc in the radial direction of the disc can be controlled in the control step.

In an optical head control device according to the invention, the judging means of the light spot moving direction judging device judges the moving direction of the main spot on the basis of the binarized data of the difference signal of the main spot from the first binarizing means and the binarized data of the difference signal of the difference signals of the two side spots from the second binarizing means. Therefore, the control means can control the position of the optical head relative to the optical disc in the radial direction of the disc.

With an optical head control method according to the invention, the moving direction of the main spot is judged in the judging step of the light spot moving direction judging step on the basis of the binarized data of the difference signal of the main spot from the first binarizing step and the binarized data of the difference signal of the difference signals of the two side spots from the second binarizing step. Therefore, the position of the optical head relative to the optical disc in the radial direction of the disc can be controlled in the control step.

An optical disc recording/replay apparatus according to the invention judges the radial moving direction of a light spot on an optical disc by using only difference signals without using any sum signal so that it can record data on or reproduce data from the optical disc, accurately radially moving the optical head according to the user's intention on the basis of the judgment.

The invention claimed is:

1. A light spot moving direction judging device for detecting reflected light coming from a main spot formed on an optical disc by a first light beam irradiated onto the optical disc and the reflected light coming from a side spot formed on the optical disc by a second light beam also irradiated onto the optical disc and for judging a radial moving direction of the main spot based on an outcome of the detection, said optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, said device comprising:

first computing means for computationally producing a difference signal of two signals obtained by detecting a quantity of the reflected light coming from the main spot by means of first two divided detecting regions;

second computing means for computationally producing a difference signal of two signals obtained by detecting a quantity of the reflected light coming from one side spot by means of second two divided detecting regions;

first binarizing means for binarizing the difference signal of the main spot computationally produced by the first computing means;

second binarizing means for binarizing the difference signal of the side spot computationally produced by the second computing means; and judging means for judging the radial moving direction of the main spot based on the binarized data from the first binarizing means and the binarized data from the second binarizing means wherein said judging means comprises a judgment data generating section for generating judgment data for judging the radial moving direction of said main spot, said judgement data generating section including two synchronous type flip-flop circuits and a changeover switch for selectively outputting a positive output of one of the flip-flop circuits and an inverted output of an other flip-flop circuit according to a low or high state of the binarized data from said first binarizing means.

2. The device according to claim 1, wherein said judging means further comprises a determining section for determining the radial moving direction of said main spot by using the judgment data generated by the judgment data generating section.

3. The device according to claim 2, wherein said judgment data generating section of said judging means samples two consecutive outcomes of computation of said second binarizing means for each changing point of an outcome of computation of said first binarized means and selectively outputs one of the sampled two consecutive outcomes of computation according to the outcome of computation of said first binarizing means.

4. The device according to claim 1, wherein said judging means judges the radial moving direction of said main spot for each of said recording tracks.

5. A light spot moving direction judging method for detecting reflected light coming from a main spot formed on an optical disc by a first light beam irradiated onto the optical disc and reflected light coming from a side spot formed on the optical disc by a second light beam also irradiated onto the optical disc and judging a radial moving direction of the main spot based on an outcome of the detection, said optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, the method comprising:

a first computing step of computationally producing a difference signal of two signals obtained by detecting a quantity of the reflected light coming from the main spot by means of first two divided detecting regions;

a second computing step of computationally producing a difference signal of the two signals obtained by detecting a quantity of the reflected light coming from the one side spot by means of second two divided detecting regions;

a first binarizing step of binarizing the difference signal of the main spot computationally produced from the first computing step;

a second binarizing step of binarizing the difference signal of the side spot computationally produced from the second computing step; and a judging step of judging moving direction of the main spot based on the binarized data from the first binarizing step and the binarized data from the second binarizing step by using two synchronous type flip-flop circuits and a changeover switch for selectively outputting a positive output of one of the flip-flip circuits and an inverted output of an other flip-flop circuit according to a low or high state of the binarized data from said first binarizing step.

6. The method according to claim 5, wherein said judging step includes a judgment data generating step for generating judgment data for judging the radial moving direction of said main spot and a determining step for determining the radial moving direction of said main spot by using the judgment data generated in the judgment data generating step.

7. A light spot moving direction judging device for detecting reflected light coming from a main spot formed on an optical disc by a first light beam irradiated onto the optical disc and reflected light coming from a pair of second side spots formed on the optical disc by a pair of light beams also irradiated onto the optical disc and judging a radial moving direction of the main spot based on an the outcome of the detection, said optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, the device comprising:

first computing means for computationally producing a difference signal of two signals obtained by detecting a quantity of the reflected light coming from the main spot by means of first two divided detecting regions;

second computing means for computationally producing a difference signal of two signals obtained by detecting a quantity of the reflected light coming from one of the pair of side spots by means of second two divided detecting regions;

third computing means for computationally producing a difference signal of two signals obtained by detecting a quantity of reflected light coming from the other of the pair of side spots by means of third two divided detecting regions;

fourth computing means for computationally producing a difference signal of the difference signal computationally produced by the second computing means and the difference signal computationally produced by the third computing means;

first binarizing means for binarizing the difference signal of the main spot computationally produced by the first computing means;

second binarizing means for binarizing the difference signal of the difference signals of the two side spots computationally produced by the fourth computing means; and judging means for judging the radial moving direction of the main spot based on the binarized data from the first binarizing means and the binarized data from the second binarizing means, wherein said judging means comprises a judgment data generating section for generating judgment data for judging the radial moving direction of said main spot, said judgement data generating section including two synchronous type flip-flop circuits and a changeover switch for selectively outputting a positive output of one of the flip-flop circuits and an inverted output of an other flip-flop circuit according to a low or high state of the binarized data from said first binarizing means.

8. The device according to claim 7, wherein said judging means further comprises a determining section for determining the radial moving direction of said main spot by using the judgment data generated by the judgment data generating section.

9. The device according to claim 8, wherein said judgment data generating section of said judging means samples two consecutive outcomes of computation of said second binarizing means for each changing point of an outcome of computation of said first binarized means and selectively outputs one of the sampled two outcomes of computation according to the outcome of computation of said first binarizing means.

10. The device according to claim 7, wherein said judging means judges the radial moving direction of said main spot for each of said recording tracks.

11. A light spot moving direction judging method for detecting reflected first light coming from a main spot formed on an optical disc by a light beam irradiated onto the optical disc and reflected light coming from a pair of side spots formed on the optical disc by a pair of second light beams also irradiated onto the optical disc and judging a radial moving direction of the main spot based on an outcome of the detection, said optical disc having lands and grooves helically arranged side by side on the surface and operating as recording tracks, each pair of said lands located adjacently and sandwiching a groove and/or each pair of said grooves located adjacently and sandwiching a land respectively having different heights and/or depths, the method comprising:

a first computing step of computationally producing a difference signal of the two signals obtained by detecting a quantity of the reflected light coming from the main spot by means of two divided detecting regions;

a second computing step of computationally producing a difference signal of two signals obtained by detecting a quantity of the reflected light coming from one of the pair of side spots by means of second two divided detecting regions;

a third computing step of computationally producing a difference signal of two signals obtained by detecting a quantity of the reflected light coming from the other of the pair of side spots by means of third two divided detecting regions;

a fourth computing step of computationally producing difference signal of the difference signal computationally produced from the second computing step and the difference signal computationally produced from the third computing step;

a first binarizing step of binarizing the difference signal of the main spot computationally produced from the first computing step;

a second binarizing step of binarizing the difference signal of the difference signals of the two side spots computationally produced from the fourth computing step; and a judging step of judging the radial moving direction of the main spot based on the binarized data from the first binarizing step and the binarized data from the second binarizing step by using two synchronous type flip-flop circuits and a changeover switch for selectively outputting a positive output of one of the flip-flop circuits and an inverted output of an other flip-flop circuit according to a low or high state of the binarized data from said first binarizing step.

12. The method according to claim 11, wherein said judging step includes a judgment data generating step for generating judgment data for judging the radial moving direction of said main spot and a determining step for determining the radial moving direction of said main spot by using the judgment data generated in the judgment data generating step.

13. An optical head control device for controlling an optical head adapted to irradiate a main light beam and a pair of side light beams onto an optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, said device comprising:

light spot moving direction judging device having:

a first computing means for computationally producing a difference signal of two signals obtained by detecting a quantity of reflected light coming from a main spot by means of first two divided detecting regions;

second computing means for computationally producing a difference signal of two signals obtained by detecting a quantity of reflected light coming from one of a pair of side spots by means of second two divided detecting regions;

first binarizing means for binarizing the difference signal of the main spot computationally produced by the first computing means;

second binarizing means for binarizing the difference signal of the one side spot computationally produced by the second computing means; and judging means for judging a moving direction of the main spot based on the binarized data from the first binarizing means and the binarized data from the second binarizing means; and control means for controlling a position of the optical head in a radial direction of the optical disc based on the moving direction of the main spot as judged by the light spot moving direction judging device, said optical head irradiating light beams onto the optical disc, wherein said judging means comprises a judgment data generating section for generating judgment data for judging the radial moving direction of said main spot, said judgment data generating section including two synchronous type flip-flop circuits and a changeover switch for selectively outputting a positive output of one of the flip-flop circuits and an inverted output of another flip-flop circuit according to a low or high state of the binarized data from said first binarizing means.

14. The device according to claim 13, wherein said control means controls said optical head tracking to said optical disc based on the difference signal of the two signals for the quantity of light of the reflected light coming from at least one of said two side spots as detected by the second two divided detecting regions.

15. The device according to claim 14, wherein said at least one of said two side spots is arranged in a central part of two adjacently located tracks.

16. The device according to claim 14, wherein said at least one of said two side spots is arranged on one of said two grooves.

17. An optical head control method for controlling an optical head that forms a main spot and a pair of side spots onto an optical disc having lands and grooves helically arranged side by side on a surface thereof that operate as recording tracks, each pair of said lands located adjacently and sandwiching a groove and/or each pair of said grooves located adjacently and sandwiching a land respectively having different heights and/or depths, said method comprising:

a light spot moving direction judging step including:

a first computing step of computationally producing a difference signal of two signals obtained by detecting a quantity of reflected light coming from the main spot by means of first two divided detecting regions;

a second computing step of computationally producing difference signal of two signals obtained by detecting a quantity of the reflected light coming from the one side spot by means of second two divided detecting regions;

a first binarizing step of binarizing the difference signal of the main spot computationally produced from the first computing step;

a second binarizing step of binarizing the difference signal of the side spot computationally produced from the second computing step; and a judging step of judging a moving direction of the main spot based on binarized data from the first binarizing step and binarized data from the second binarizing step; and a control step of controlling position of the optical head in a radial direction of the optical disc based on the moving direction of the main spot as judged in the light spot moving direction judging step by using two synchronous type flip-flop circuits and a changeover switch for selectively outputting a positive output of one of the flip-flop circuits and a inverted output of an other flip-flop circuit according to a low or high state of the binarized data from said first binarizing step.

18. The method according to claim 17, wherein tracking of said optical head on said optical disc is controlled in said control step based on the basis of the difference signal of the two signals for the quantity of the reflected light coming from at least one of said two side spots as detected by the first two divided detecting regions.

19. The method according to claim 18, wherein said at least one of said two side spots is arranged in a central part of two adjacently located tracks.

20. The method according to claim 18, wherein said at least one of said two side spots is arranged on one of said two grooves.

21. An optical head control device for controlling an optical head adapted to form a main spot and a pair of side spots onto an optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, said device comprising:

a light spot moving direction judging device having:

first computing means for computationally producing a difference signal of two signals obtained by detecting a quantity of reflected light coming from the main spot by means of first two divided detecting regions;

second computing means for computationally producing a difference signal of two signals obtained by detecting a quantity of reflected light coming from one of the side spots by means of second two divided detecting regions;

third computing means for computationally producing a difference signal of the two signals obtained by detecting a quantity of the reflected light coming from other side spots by means of third two divided detecting regions;

fourth computing means for computationally producing a difference signal of the difference signal computationally produced by the second computing means and the difference signal computationally produced by the third computing means;

first binarizing means for binarizing the difference signal of the main spot computationally produced by the first computing means;

second binarizing means for binarizing the difference signal of the difference signal computationally produced by the fourth computing means; and judging means for judging a moving direction of the main spot based on binarized data from the first binarizing means and binarized data from the second binarizing means; and control means for controlling a position of the optical head in a radial direction of the optical disc based on the moving direction of the main spot as judged by the light spot moving direction judging device, wherein said judging means comprises a judgment data generating section for generating judgment data for judging the radial moving direction of said main spot, said judgment data generating section including two synchronous type flip-flop circuits and a changeover switch for selectively outputting a positive output of one of the flip-flop circuits and an inverted output of an other flip-flop circuit according to a low or high state of the binarized data from said first binarizing means.

22. The device according to claim 21, wherein said control means controls tracking of said optical head based on the difference signal produced by the second computing means.

23. The device according to claim 22, wherein said at least one of said two side spots is arranged in a central part of two adjacently located tracks.

24. The device according to claim 22, wherein said at least one of said two side spots is arranged on one of said two grooves.

25. An optical head control method for controlling an optical head adapted to form a main spot and a pair of side spots onto an optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, said method comprising:

a light spot moving direction judging step including:

a first computing step of computationally producing a difference signal of two signals obtained by detecting a quantity of reflected light coming from the main spot by means of first two divided detecting regions;

a second computing step of computationally producing a difference signal of two signals obtained by detecting a quantity of reflected light coming from one of the side spots by means of second two divided detecting regions;

a third computing step of computationally producing a difference signal of two signals obtained by detecting a quantity of the reflected light coming from an other of the side spots by means of third two divided detecting regions;

a fourth computing step of computationally producing a difference signal of the difference signal computationally produced from the second computing step and the difference signal computationally produced from the third computing step;

a first binarizing step of binarizing the difference signal of the main spot computationally produced from the first computing step;

a second binarizing step of binarizing the difference signal of the difference signals of the two side spots computationally produced from the fourth computing step; and a judging step of judging a moving direction of the main spot based on binarized data from first binarizing step and the binarized data from the second binarizing step by using two synchronous type flip-flop circuits and a changeover switch for selectively outputting a positive output of one of the flip-flop circuits and an inverted output of an other flip-flop circuit according to a low or high state of the binarized data from said first binarizing step; and a control step of controlling a position of the optical head in a radial direction of the optical disc based on the moving direction of the main spot as judged in the light spot moving direction judging step.

26. The method according to claim 25, wherein tracking of said optical head on said optical disc is controlled in said control step based on the basis of the difference signal produced in the second computing step.

27. The method according to claim 26, wherein said at least one of said two side spots is arranged in a central part of two adjacently located tracks.

28. The method according to claim 26, wherein said at least one of said two side spots is arranged on one of said two grooves.

29. An optical disc recording/replay apparatus for recording data on and reproducing data from an optical disc by forming a main spot of a light beam and a pair of side spots of light beams on an optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, said device comprising:

a light spot moving direction judging device having:

first computing means for computationally producing a difference signal of two signals obtained by detecting a quantity of the reflected light coming from the main spot by means of first two divided detecting regions;

second computing means for computationally producing a difference signal of two signals obtained by detecting a quantity of the reflected light coming from one side spot by means of second two divided detecting regions;

first binarizing means for binarizing the difference signal of the main spot computationally produced by the first computing means;

second binarizing means for binarizing the difference signal of the one side spot computationally produced by the second computing means; and judging means for judging moving direction of the main spot based on binarized data from the first binarizing means and binarized data from the second binarizing means; and control means for controlling a position of the optical head in a radial direction of the optical disc based on the moving direction of the main spot as judged by the light spot moving direction judging device, wherein said judging means comprises a judgment data generating section for generating judgment data for judging the radial moving direction of said main spot, said judgment data generating section including two synchronous type flip-flop circuit and a changeover switch for selectively outputting a positive output of one of the flip-flop circuits and an inverted output of an other flip-flop circuit according to a low or high state of the binarized data from said first binarizing means.

30. An optical disc recording/replay apparatus for recording data on and reproducing data from an optical disc by forming a main spot of a light beam and a pair of side spots of light beams on an optical disc having lands and grooves helically arranged side by side on a surface thereof and operating as recording tracks, each pair of said lands located adjacently and sandwiching a groove and/or each pair of said grooves located adjacently and sandwiching a land respectively having different heights and/or depths, said device comprising:

a light spot moving direction judging device having:

first computing means for computationally producing a difference signal of two signals obtained by detecting a quantity of reflected light coming from the main spot by means of first two divided detecting regions;

second computing means for computationally producing a difference signal of two signals obtained by detecting a quantity of the reflected light coming from one of the side spots by means of second two divided detecting regions;

third computing means for computationally producing a difference signal of two signals obtained by detecting a quantity of the reflected light coming from an other of the side spots by means of third two divided detecting regions;

fourth computing means for computationally producing a difference signal of the difference signal computationally produced by the second computing means and the difference signal computationally produced by the third computing means;

first binarizing means for binarizing the difference signal of the main spot computationally produced by the first computing means;

second binarizing means for binarizing the difference signal produced by the fourth computing means; and judging means for judging a moving direction of the main spot based on binarized data from first binarizing means and the binarized data from the second binarizing means; and control means for controlling a position of the optical head in a radial direction of the optical disc based on the moving direction of the main spot as judged by the light spot moving direction judging device, wherein said judging means comprises a judgment data generating section for generating judgment data for judging the radial moving direction of said main spot, said judgment data generating section including two synchronous type flip-flop circuits and a changeover switch for selectively outputting a positive output of one of the flip-flop circuits and an inverted output of an other flip-flop circuit according to a low or high state of the binarized data from said first binarizing means.

* * * * *